United States Patent
Hannon et al.

(10) Patent No.: US 10,547,736 B2
(45) Date of Patent: *Jan. 28, 2020

(54) DETECTING THE LOCATION OF A PHONE USING RF WIRELESS AND ULTRASONIC SIGNALS

(71) Applicant: Driving Management Systems, Inc., San Francisco, CA (US)

(72) Inventors: Marwan Hannon, San Francisco, CA (US); Peter Qiang Qu, Palo Alto, CA (US); James W. Allison, Carmel Valley, CA (US); Cristian Cesane, Iasi (RO)

(73) Assignee: Driving Management Systems, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/225,376

(22) Filed: Dec. 19, 2018

(65) Prior Publication Data

US 2019/0199850 A1    Jun. 27, 2019

Related U.S. Application Data

(63) Continuation of application No. 15/210,649, filed on Jul. 14, 2016, now Pat. No. 10,205,819.

(Continued)

(51) Int. Cl.
*H04W 4/80* (2018.01)
*H04M 1/725* (2006.01)
(Continued)

(52) U.S. Cl.
CPC ....... *H04M 1/72577* (2013.01); *G01S 5/0036* (2013.01); *G01S 5/18* (2013.01);
(Continued)

(58) Field of Classification Search
CPC ......... H04M 1/72577; H04M 1/72572; H04W 4/40; H04W 4/02; H04W 4/80;
(Continued)

(56) References Cited

U.S. PATENT DOCUMENTS 5,258,968 A  11/1993 Matsuda et al.
6,188,315 B1  2/2001 Herbert et al.
(Continued)

FOREIGN PATENT DOCUMENTS

CN  201224324 Y  4/2009
CN  101554835 A  10/2009
(Continued)

OTHER PUBLICATIONS

AlcoMate Premium AL7000 Breathalyzer Product Specifications, http://alcomate.net/index.php/model-al7000.html, Jun. 16, 2011.
(Continued)

*Primary Examiner* — Chuong A Ngo
(74) *Attorney, Agent, or Firm* — K&L Gates LLP

(57) ABSTRACT

A system and method for determining a presence of a mobile device located in a predetermined detection zone within a vehicle may include a plurality of transmitters located within the vehicle, in which each of the plurality of transmitters is configured to transmit an acoustic signal into an acoustic environment within the vehicle, and in which each of the acoustic signals comprises at least one ultrasonic pulse, a mobile device configured to periodically record sounds in the acoustic environment, and a processor configured to determine that a periodically recorded sound by the mobile device comprises each of the acoustic signals transmitted by the plurality of transmitters, determine a location of the mobile device within the vehicle based on the acoustic (Continued)

signals recorded by the mobile device, and determine that the location of the mobile device matches the predetermined detection zone.

11 Claims, 18 Drawing Sheets

Related U.S. Application Data

(60) Provisional application No. 62/192,354, filed on Jul. 14, 2015.

(51) Int. Cl.
| | |
|---|---|
| *H04W 4/02* | (2018.01) |
| *H04W 4/029* | (2018.01) |
| *G01S 5/00* | (2006.01) |
| *G01S 5/18* | (2006.01) |
| *G01S 5/28* | (2006.01) |
| *G01S 5/30* | (2006.01) |
| *G01S 11/16* | (2006.01) |
| *H04W 4/40* | (2018.01) |
| *H04W 88/02* | (2009.01) |
| *H04W 84/00* | (2009.01) |

(52) U.S. Cl.
CPC .................... *G01S 5/28* (2013.01); *G01S 5/30* (2013.01); *G01S 11/16* (2013.01); *H04W 4/02* (2013.01); *H04W 4/023* (2013.01); *H04W 4/029* (2018.02); *H04W 4/40* (2018.02); *H04W 4/80* (2018.02); *H04M 1/72572* (2013.01); *H04W 84/005* (2013.01); *H04W 88/02* (2013.01)

(58) Field of Classification Search
CPC ... H04W 88/02; H04W 84/005; H04W 8/005; G01S 5/30; G01S 11/16; G01S 5/0036; G01S 5/28; G01S 5/18
See application file for complete search history.

(56) References Cited

U.S. PATENT DOCUMENTS

| | | | |
|---|---|---|---|
| 6,556,810 B2 | 4/2003 | Suzuki |
| 6,620,108 B2 | 9/2003 | Duval et al. |
| 6,690,618 B2 | 2/2004 | Tomasi et al. |
| 6,726,636 B2 | 4/2004 | Der Ghazarian et al. |
| 6,728,542 B2 | 4/2004 | Meda |
| 6,892,131 B2 | 5/2005 | Coffee et al. |
| 6,901,264 B2 | 5/2005 | Myr |
| 6,904,110 B2 | 6/2005 | Trans et al. |
| 6,967,581 B2 | 11/2005 | Karsten |
| 7,084,894 B2 | 8/2006 | Van Brocklin et al. |
| 7,086,596 B2 | 8/2006 | Meier et al. |
| 7,095,402 B2 | 8/2006 | Kunii et al. |
| 7,126,937 B2 | 10/2006 | Crosbie et al. |
| 7,170,404 B2 | 1/2007 | Albert et al. |
| 7,173,536 B2 | 2/2007 | Duval |
| 7,181,229 B2 | 2/2007 | Singh et al. |
| 7,200,409 B1 | 4/2007 | Ichikawa et al. |
| 7,206,696 B2 | 4/2007 | Furukawa |
| 7,215,944 B2 | 5/2007 | Mecca |
| 7,218,236 B2 | 5/2007 | Mobley et al. |
| 7,254,417 B2 | 8/2007 | Slemmer et al. |
| 7,260,022 B2 | 8/2007 | Schliep et al. |
| 7,260,221 B1 | 8/2007 | Atsmon |
| 7,283,904 B2 | 10/2007 | Benjamin et al. |
| 7,287,617 B2 | 10/2007 | Mobley et al. |
| 7,292,936 B2 | 11/2007 | Furukawa |
| 7,299,890 B2 | 11/2007 | Mobley et al. |
| 7,319,455 B2 | 1/2008 | Kunii et al. |
| 7,377,352 B2 | 5/2008 | Mobley et al. |
| 7,379,083 B2 | 5/2008 | Van Brocklin et al. |
| 7,406,000 B2 | 7/2008 | Lee |
| 7,413,047 B2 | 8/2008 | Brown et al. |
| 7,426,689 B2 | 9/2008 | Simonds et al. |
| 7,464,005 B1 | 12/2008 | Beetner et al. |
| 7,481,292 B2 | 1/2009 | Mobley et al. |
| 7,505,784 B2 | 3/2009 | Barbera |
| 7,577,872 B2 | 8/2009 | DiBartolomeo et al. |
| 7,582,196 B2 | 9/2009 | Babes-Domeo et al. |
| 7,656,287 B2 | 2/2010 | Albert et al. |
| 7,660,667 B2 | 2/2010 | Furukawa |
| 7,690,572 B2 | 4/2010 | Meier et al. |
| 7,698,062 B1 | 4/2010 | McMullen et al. |
| 7,714,832 B2 | 5/2010 | Tong et al. |
| 7,728,755 B1 | 6/2010 | Jocic |
| 7,729,709 B1 | 6/2010 | Loeb et al. |
| 7,820,108 B2 | 10/2010 | Lampotang et al. |
| 7,841,224 B2 | 11/2010 | Son |
| 7,852,318 B2 | 12/2010 | Altman |
| 7,856,203 B2 | 12/2010 | Lipovski et al. |
| 7,876,205 B2 | 1/2011 | Catten et al. |
| 7,887,089 B2 | 2/2011 | Breed et al. |
| 7,891,456 B2 | 2/2011 | Takahashi et al. |
| 7,916,577 B2 | 3/2011 | Jeong et al. |
| 7,925,243 B2 | 4/2011 | McGary |
| 7,934,577 B2 | 5/2011 | Walter et al. |
| 7,966,215 B1 | 6/2011 | Myers et al. |
| 7,976,092 B2 | 7/2011 | Meredith et al. |
| 7,991,654 B1 | 8/2011 | Sacks et al. |
| 7,991,655 B1 | 8/2011 | Sacks et al. |
| 7,991,656 B1 | 8/2011 | Sacks et al. |
| 7,996,023 B2 | 8/2011 | McGary et al. |
| 8,002,957 B2 | 8/2011 | Grincourt et al. |
| 8,014,945 B2 | 9/2011 | Cooper et al. |
| 8,016,196 B2 | 9/2011 | Meier et al. |
| 8,032,764 B2 | 10/2011 | Shankar et al. |
| 8,051,449 B2 | 11/2011 | Kunii et al. |
| 8,065,051 B2 | 11/2011 | Chopcinski et al. |
| 8,090,399 B2 | 1/2012 | Howarter et al. |
| 8,095,065 B2 | 1/2012 | Nagara et al. |
| 8,099,054 B2 | 1/2012 | Tabe |
| 8,134,481 B2 | 3/2012 | Ohki |
| 8,136,011 B2 | 3/2012 | Cho et al. |
| 8,140,358 B1 | 3/2012 | Ling et al. |
| 8,145,199 B2 | 3/2012 | Tadayon et al. |
| 8,166,081 B2 | 4/2012 | Christensen et al. |
| 8,179,271 B2 | 5/2012 | Kamiki |
| 8,196,694 B2 | 6/2012 | Biondo et al. |
| 8,200,291 B2 | 6/2012 | Steinmetz et al. |
| 8,201,437 B2 | 6/2012 | Takata |
| 8,213,914 B2 | 7/2012 | Kim et al. |
| 8,213,962 B2 | 7/2012 | Carr |
| 8,233,775 B2 | 7/2012 | Kunii et al. |
| 8,238,951 B2 | 8/2012 | McGary |
| 8,239,831 B2 | 8/2012 | Brennan et al. |
| 8,240,419 B2 | 8/2012 | Zimmermann et al. |
| 8,249,627 B2 | 8/2012 | Olincy et al. |
| 8,258,919 B2 | 9/2012 | Corradino et al. |
| 8,258,968 B2 | 9/2012 | Ghazarian et al. |
| 8,265,590 B2 | 9/2012 | Sennett et al. |
| 8,270,933 B2 | 9/2012 | Riemer et al. |
| 8,280,417 B2 | 10/2012 | Venkatachalam et al. |
| 8,290,509 B2 | 10/2012 | Jung et al. |
| 8,296,728 B1 | 10/2012 | Webster |
| 8,301,161 B2 | 10/2012 | Li |
| 8,315,597 B2 | 11/2012 | Olincy et al. |
| 8,326,635 B2 | 12/2012 | Usher et al. |
| 8,340,730 B2 | 12/2012 | Pallotta |
| 8,346,310 B2 | 1/2013 | Boll et al. |
| 8,359,014 B2 | 1/2013 | Olincy et al. |
| 8,374,636 B2 | 2/2013 | McDonough |
| 8,377,705 B2 | 2/2013 | Lambert et al. |
| 8,401,578 B2 | 3/2013 | Inselberg |
| 8,401,589 B2 | 3/2013 | Liu et al. |
| 8,401,848 B2 | 3/2013 | Dowlatkhah |
| 8,412,123 B2 | 4/2013 | Foster |
| 8,413,217 B2 | 4/2013 | Bhatia |
| 8,417,268 B1 | 4/2013 | Halferty et al. |
| 8,442,447 B2 | 5/2013 | Veluppillai et al. |

(56) References Cited

U.S. PATENT DOCUMENTS

| | | |
|---|---|---|
| 8,479,864 B2 | 7/2013 | White et al. |
| 8,498,941 B2 | 7/2013 | Felsher |
| 8,527,013 B2 | 9/2013 | Guba et al. |
| 8,594,041 B2 | 11/2013 | Mecca |
| 8,600,895 B2 | 12/2013 | Felsher |
| 8,665,077 B2 | 3/2014 | Richter |
| 8,684,922 B2 | 4/2014 | Trans |
| 8,686,864 B2 | 4/2014 | Hannon |
| 8,694,058 B2 | 4/2014 | Weiss |
| 8,706,143 B1 | 4/2014 | Elias |
| 8,718,536 B2 | 5/2014 | Hannon |
| 8,761,821 B2 | 6/2014 | Tibbitts et al. |
| 8,884,750 B2 | 11/2014 | Bacal |
| 8,968,195 B2 | 3/2015 | Tran |
| 9,028,405 B2 | 5/2015 | Tran |
| 9,060,683 B2 | 6/2015 | Tran |
| 9,069,058 B2 | 6/2015 | Booij et al. |
| 9,137,776 B2 | 9/2015 | Lavery |
| 9,160,859 B2 | 10/2015 | Tadayon et al. |
| 9,185,526 B2 | 11/2015 | Guba et al. |
| 9,209,909 B2 | 12/2015 | Booij et al. |
| 9,280,145 B2 | 3/2016 | Hannon |
| 9,311,670 B2 | 4/2016 | Hoffberg |
| 9,338,605 B2 | 5/2016 | Guba et al. |
| 9,358,940 B2 | 6/2016 | Cooper et al. |
| 9,369,196 B2 | 6/2016 | Hannon |
| 9,379,805 B2 | 6/2016 | Hannon |
| 9,398,421 B2 | 7/2016 | Guba et al. |
| 9,557,402 B2 | 1/2017 | Bartov et al. |
| 9,609,482 B1 | 3/2017 | Want et al. |
| 9,674,337 B2 | 6/2017 | Alexandre et al. |
| 9,717,108 B2 | 7/2017 | Raj et al. |
| 9,758,039 B2 | 9/2017 | Hannon |
| 9,791,540 B2 | 10/2017 | Want et al. |
| 9,820,658 B2 | 11/2017 | Trans et al. |
| 9,854,433 B2 | 12/2017 | Hannon |
| 9,860,710 B2 | 1/2018 | Buttolo et al. |
| 9,888,394 B2 | 2/2018 | Rajendran et al. |
| 10,034,145 B2 | 7/2018 | Yang et al. |
| 10,205,819 B2 | 2/2019 | Hannon et al. |
| 2002/0132646 A1 | 9/2002 | Girod |
| 2002/0156602 A1 | 10/2002 | Kunii et al. |
| 2002/0167862 A1* | 11/2002 | Tomasi ............... G01S 5/18 367/118 |
| 2003/0086515 A1 | 5/2003 | Trans et al. |
| 2003/0222144 A1 | 12/2003 | Meier et al. |
| 2004/0083031 A1 | 4/2004 | Okezie |
| 2004/0124697 A1 | 7/2004 | MacGregor et al. |
| 2004/0267607 A1 | 12/2004 | Maddux |
| 2005/0041529 A1 | 2/2005 | Schliep et al. |
| 2005/0050209 A1 | 3/2005 | Main, II |
| 2005/0064922 A1 | 3/2005 | Owens et al. |
| 2005/0186933 A1 | 8/2005 | Trans |
| 2005/0261824 A1 | 11/2005 | Furukawa |
| 2005/0261829 A1 | 11/2005 | Furukawa |
| 2006/0033628 A1 | 2/2006 | Duval |
| 2006/0058951 A1 | 3/2006 | Cooper et al. |
| 2006/0058952 A1 | 3/2006 | Cooper et al. |
| 2006/0058953 A1 | 3/2006 | Cooper et al. |
| 2006/0080031 A1 | 4/2006 | Cooper et al. |
| 2006/0080032 A1 | 4/2006 | Cooper et al. |
| 2006/0099940 A1 | 5/2006 | Pfleging et al. |
| 2006/0205394 A1 | 9/2006 | Vesterinen |
| 2006/0224945 A1 | 10/2006 | Khan et al. |
| 2006/0240860 A1 | 10/2006 | Benco et al. |
| 2006/0265508 A1 | 11/2006 | Angel et al. |
| 2007/0032225 A1 | 2/2007 | Konicek et al. |
| 2007/0088495 A1 | 4/2007 | Ibrahim |
| 2007/0130153 A1 | 6/2007 | Nachman et al. |
| 2007/0136068 A1 | 6/2007 | Horvitz |
| 2007/0182595 A1 | 8/2007 | Ghasabian |
| 2007/0188472 A1 | 8/2007 | Ghasabian |
| 2007/0196078 A1 | 8/2007 | Kunii et al. |
| 2007/0288164 A1 | 12/2007 | Gordon et al. |
| 2008/0009296 A1 | 1/2008 | Han |
| 2008/0123580 A1 | 5/2008 | Vathulya |
| 2008/0147314 A1 | 6/2008 | Cubillo |
| 2008/0168398 A1 | 7/2008 | Geelen et al. |
| 2008/0182598 A1 | 7/2008 | Bowman |
| 2008/0208447 A1 | 8/2008 | Geelen et al. |
| 2009/0012704 A1 | 1/2009 | Franco et al. |
| 2009/0024707 A1 | 1/2009 | Aase et al. |
| 2009/0028179 A1 | 1/2009 | Albal |
| 2009/0075139 A1 | 3/2009 | Kucernak et al. |
| 2009/0083035 A1 | 3/2009 | Huang et al. |
| 2009/0089293 A1 | 4/2009 | Garritano et al. |
| 2009/0112572 A1 | 4/2009 | Thorn |
| 2009/0146848 A1 | 6/2009 | Ghassabian |
| 2009/0177736 A1 | 7/2009 | Christensen et al. |
| 2009/0215387 A1 | 8/2009 | Brennan et al. |
| 2009/0215466 A1 | 8/2009 | Ahl et al. |
| 2009/0238386 A1 | 9/2009 | Usher et al. |
| 2009/0253423 A1 | 10/2009 | Kullberg |
| 2009/0255917 A1 | 10/2009 | Feichko et al. |
| 2009/0264161 A1 | 10/2009 | Usher et al. |
| 2009/0316529 A1 | 12/2009 | Huuskonen et al. |
| 2010/0004004 A1 | 1/2010 | Browne-Swinburne et al. |
| 2010/0009626 A1 | 1/2010 | Farley |
| 2010/0010740 A1 | 1/2010 | Nachman et al. |
| 2010/0035596 A1 | 2/2010 | Nachman et al. |
| 2010/0035632 A1 | 2/2010 | Catten |
| 2010/0039224 A1 | 2/2010 | Okude et al. |
| 2010/0062788 A1 | 3/2010 | Nagorniak |
| 2010/0082820 A1 | 4/2010 | Furukawa |
| 2010/0113073 A1 | 5/2010 | Schlesener et al. |
| 2010/0131304 A1 | 5/2010 | Collopy et al. |
| 2010/0164836 A1 | 7/2010 | Liberatore |
| 2010/0199176 A1 | 8/2010 | Chronqvist |
| 2010/0236924 A1 | 9/2010 | Chapples et al. |
| 2010/0251804 A1 | 10/2010 | Morley et al. |
| 2010/0269566 A1 | 10/2010 | Carroll et al. |
| 2010/0279626 A1 | 11/2010 | Bradley et al. |
| 2010/0297929 A1 | 11/2010 | Harris |
| 2010/0306309 A1 | 12/2010 | Santori et al. |
| 2010/0311345 A1 | 12/2010 | Santori et al. |
| 2010/0317420 A1 | 12/2010 | Hoffberg |
| 2010/0322293 A1 | 12/2010 | Rhodes et al. |
| 2010/0331051 A1 | 12/2010 | Kim et al. |
| 2010/0332226 A1 | 12/2010 | Lee et al. |
| 2011/0009107 A1 | 1/2011 | Guba et al. |
| 2011/0015934 A1 | 1/2011 | Rowe et al. |
| 2011/0029869 A1 | 2/2011 | McLennan |
| 2011/0032096 A1 | 2/2011 | Miller et al. |
| 2011/0045813 A1 | 2/2011 | Choi |
| 2011/0045839 A1 | 2/2011 | Chao |
| 2011/0063098 A1 | 3/2011 | Fischer et al. |
| 2011/0065375 A1 | 3/2011 | Bradley |
| 2011/0079073 A1 | 4/2011 | Keays |
| 2011/0084807 A1 | 4/2011 | Logan et al. |
| 2011/0086668 A1 | 4/2011 | Patel |
| 2011/0093474 A1 | 4/2011 | Etchegoyen |
| 2011/0102160 A1 | 5/2011 | Heubel et al. |
| 2011/0105084 A1 | 5/2011 | Chandrasekaran |
| 2011/0111724 A1 | 5/2011 | Baptiste |
| 2011/0133919 A1 | 6/2011 | Evarts et al. |
| 2011/0143786 A1 | 6/2011 | Fan et al. |
| 2011/0153120 A1 | 6/2011 | Katou |
| 2011/0153742 A1 | 6/2011 | Sloop et al. |
| 2011/0175930 A1 | 7/2011 | Hwang et al. |
| 2011/0187646 A1 | 8/2011 | Mahmoud |
| 2011/0207441 A1 | 8/2011 | Wood |
| 2011/0212737 A1 | 9/2011 | Isidore |
| 2011/0219080 A1 | 9/2011 | McWhithey et al. |
| 2011/0230165 A1 | 9/2011 | Kleve et al. |
| 2011/0263293 A1 | 10/2011 | Blake et al. |
| 2011/0288764 A1 | 11/2011 | Sathish et al. |
| 2011/0304446 A1 | 12/2011 | Basson et al. |
| 2011/0304465 A1 | 12/2011 | Boult et al. |
| 2011/0306304 A1 | 12/2011 | Forutanpour et al. |
| 2012/0004933 A1 | 1/2012 | Foladare et al. |
| 2012/0032876 A1 | 2/2012 | Tabe |
| 2012/0034954 A1 | 2/2012 | Tabe |
| 2012/0035923 A1 | 2/2012 | Krause |
| 2012/0052854 A1 | 3/2012 | DiMeo et al. |

(56) References Cited

U.S. PATENT DOCUMENTS

| | | |
|---|---|---|
| 2012/0064924 A1 | 3/2012 | Schapsis et al. |
| 2012/0066638 A1 | 3/2012 | Ohri |
| 2012/0109451 A1 | 5/2012 | Tan |
| 2012/0110126 A1 | 5/2012 | Sparks |
| 2012/0119936 A1 | 5/2012 | Miller et al. |
| 2012/0122525 A1 | 5/2012 | Miller et al. |
| 2012/0136503 A1 | 5/2012 | Schunder |
| 2012/0136529 A1 | 5/2012 | Curtis et al. |
| 2012/0140147 A1 | 6/2012 | Satoh et al. |
| 2012/0157069 A1 | 6/2012 | Elliott et al. |
| 2012/0176237 A1 | 7/2012 | Tabe et al. |
| 2012/0228047 A1 | 9/2012 | White et al. |
| 2012/0236136 A1 | 9/2012 | Boddy |
| 2012/0244883 A1 | 9/2012 | Tibbitts et al. |
| 2012/0265535 A1 | 10/2012 | Bryant-Rich et al. |
| 2012/0283894 A1 | 11/2012 | Naboulsi |
| 2012/0284659 A1 | 11/2012 | De Leon |
| 2013/0046562 A1 | 2/2013 | Taylor et al. |
| 2013/0084847 A1 | 4/2013 | Tibbitts et al. |
| 2013/0316737 A1 | 11/2013 | Guba et al. |
| 2013/0336094 A1 | 12/2013 | Gruteser et al. |
| 2014/0179356 A1 | 6/2014 | Hannon |
| 2014/0335902 A1 | 11/2014 | Guba et al. |
| 2014/0357192 A1 | 12/2014 | Azogiu et al. |
| 2015/0043309 A1 | 2/2015 | Calvarese |
| 2015/0062091 A1 | 3/2015 | Li |
| 2015/0113175 A1 | 4/2015 | Brezezinski et al. |
| 2015/0139058 A1 | 5/2015 | Xia |
| 2015/0149042 A1* | 5/2015 | Cooper ............... B60R 16/037 701/48 |
| 2016/0066013 A1 | 3/2016 | Li et al. |
| 2016/0073324 A1 | 3/2016 | Guba et al. |
| 2016/0353251 A1* | 12/2016 | Yang ................... H04W 4/046 |
| 2017/0075740 A1 | 3/2017 | Guba et al. |
| 2017/0078948 A1 | 3/2017 | Breaux et al. |
| 2017/0322287 A1 | 11/2017 | Benbouhout et al. |
| 2018/0069438 A1 | 3/2018 | Bit-Babik et al. |
| 2018/0164398 A1 | 6/2018 | Olsen et al. |
| 2018/0252796 A1 | 9/2018 | Qu et al. |
| 2018/0370360 A1 | 12/2018 | Hannon |
| 2019/0025402 A1 | 1/2019 | Qu et al. |

FOREIGN PATENT DOCUMENTS

| | | |
|---|---|---|
| CN | 201347000 Y | 11/2009 |
| CN | 101808273 A | 8/2010 |
| CN | 201792751 U | 4/2011 |
| CN | 102256206 A | 11/2011 |
| EP | 2428028 A1 | 3/2012 |
| EP | 2708910 A1 | 3/2014 |
| EP | 2428028 A4 | 7/2014 |
| EP | 2995006 A2 | 3/2016 |
| EP | 2995006 A4 | 1/2017 |
| GB | 1401318 | 7/1975 |
| JP | H10200961 | 7/1998 |
| JP | 2000230900 A | 8/2000 |
| JP | 2002335584 A | 4/2002 |
| JP | 2004249847 A | 9/2004 |
| JP | 2007106277 A | 4/2007 |
| JP | 4034813 B2 | 1/2008 |
| JP | 2008137624 | 6/2008 |
| JP | 208160715 A | 7/2008 |
| JP | 4351286 | 10/2009 |
| JP | 2009284442 A | 12/2009 |
| JP | 2013219678 A | 10/2013 |
| KR | 10199800440012 | 9/1998 |
| KR | 1019990043676 | 6/1999 |
| KR | 20000001005 | 1/2000 |
| TW | 201239384 A | 10/2012 |
| WO | 200108328 A1 | 2/2001 |
| WO | 2002012883 A1 | 2/2002 |
| WO | 2004018249 A1 | 3/2004 |
| WO | 2009014703 A1 | 1/2009 |
| WO | 2010129939 A1 | 11/2010 |
| WO | 2014182971 A2 | 11/2014 |
| WO | 2014182971 A3 | 11/2014 |
| WO | 2015070064 A1 | 5/2015 |
| WO | 2016210181 A1 | 12/2016 |

OTHER PUBLICATIONS

Breathalyzer—Wikipedia, the free encyclopedia, http://en.wikipedia.org/wiki/Breathalyzer, Jun. 16, 2011.

Bluetooth SIG, Bluetooth Specification Version 4.0 [vol. 0].

International Search Report & Written Opinion for corresponding PCT Application No. PCT/US2016/042305 dated Oct. 19, 2016.

Supplemental Search Report for corresponding EP Application No. EP17739027 dated Jul. 31, 2019.

Partial Supplemental European Search Report for corresponding EP Application No. 16825187.4 dated Jun. 12, 2019.

How Stuff Works: How Breathalyzers Work, Jun. 16, 2011.

Swerdlow, Alexej et al., "Speaker Position Estimation in Vehicles by Means of Acoustic Analysis," Fortschritte Der Akustik: DAGA, Mar. 2008 in Dresden.

Yang, et al., "Detecting Driver Phone Use Leveraging Car Speakers," MobiCom'11, Sep. 19-23, 2011, Las Vegas, Nevada, USA, 12 pages.

* cited by examiner

DETECTING THE LOCATION OF A PHONE USING RF WIRELESS AND ULTRASONIC SIGNALS

CROSS REFERENCE TO RELATED APPLICATION

This application is a continuation application filed under 35 U.S.C. § 120 of U.S. patent application Ser. No. 15/210,649, filed Jul. 14, 2016, entitled "DETECTING THE LOCATION OF A PHONE USING RF WIRELESS AND ULTRASONIC SIGNALS," now U.S. Pat. No. 10,205,819, and which further claims the benefit, under 35 USC § 119(e), of U.S. provisional patent application No. 62/192,354, filed Jul. 14, 2015, entitled "DETECTING THE LOCATION OF A PHONE USING RF WIRELESS AND ULTRASONIC SIGNALS", the entire disclosures of which are hereby incorporated by reference in their entirety and for all purposes.

BACKGROUND

Mobile devices such as wireless devices, including, for example, cellular telephones, smart phones, laptop computers, notebook computers, tablet devices (e.g., iPad by Apple®) are ubiquitous in modern society. Use of such mobile devices while operating a vehicle, however, can be hazardous. The problem is exacerbated for inexperienced operators of the vehicle, such as youngsters just learning how to drive. Rates of vehicular accidents where mobile devices are involved are rising, especially with teenagers. Text messaging while operating a moving vehicle can be dangerous and has been linked with causing accidents. More generally, operating any keyboard or other interactive device while operating a vehicle can be dangerous.

Thus, the widespread adoption of mobile devices and common use of the devices while driving has raised concerns about the distraction of drivers. A driver speaking, text messaging, or using a software application on a mobile telephone may become mentally distracted from driving and lose control of the vehicle that he or she is driving. Thus, it is not uncommon to see an individual involved in an accident who was speaking or text messaging on a mobile device rather than paying attention to the road. Studies now suggest that individuals speaking on mobile telephones while driving a car may be as impaired as a person who drives while intoxicated. Not only is the driver mentally distracted, but eyes of the driver are diverted for dialing, looking to see who an incoming call is from.

It would be highly desirable to detect the presence of a mobile device, such as a wireless device, within a vehicle and control or inhibit the operation of the mobile device.

SUMMARY

With the advancement of mobile technology, we have the capability to stay connected at all time. For many people, the urge to stay connected does not stop when they are behind the driving wheel. Driving while distracted by mobile technology is an endangerment to both the driver and general public. The present disclosure seeks to discourage distracted driving by partially inhibiting a function of a mobile device that might otherwise be used in a moving vehicle and in the proximity of the driver seat. Disclosed herein are details regarding technology that detects whether the mobile device is on the driver seat.

Most location detection technology relies on two phenomena of physics: time of arrival and received power. The time of arrival (TOA) is a location detection technique. If a distant transmitter emits a wave, and the receiver detects the wave at a later time, the distance between the transmitter and receiver is determined by the formula d=V*t, where V is the propagation velocity of the wave, and t is the time that the wave takes to arrive at the receiver. TOA detection has been used extensively with sound wave (such as sonar), because of the relative slow speed of sound lends to high location detection accuracy. At normal temperature, pressure and humidity, sound wave travels at 340 meters per second, or approximately 1 foot per millisecond. Many animals and modern instruments are capable of measuring TOA with sufficient accuracy for good location detection. For example, some dolphins and bats are known to use ultrasonic echo to locate their prey. Additionally, submarines use sonar to detect enemy vessels. Further, backup sensors installed on vehicles use ultrasonic sonar to detect obstruction.

The use of TOA with electromagnetic wave has been limited due to high speed of the electromagnetic wave. All electromagnetic waves travel at speed of light, that is $3*10^8$ m/s, or approximately 1 foot per nanosecond. If sub-meter location accuracy is desired, then synchronization between transmitter and receiver, and the measurement of TOA must have accuracy of sub-nanoseconds. The electronic systems capable of measuring nanoseconds, or at high GHz frequency, are often expensive. An interesting implementation of TOA with electromagnetic wave is the Global Positioning System. The GPS partially circumvents the nanoseconds timing challenge by having multiples GPS satellites synchronized using atomic clocks, and then continuously send GPS signal packets containing the time stamp from the satellites. The GPS receivers at the ground now are relieved from the burden of high accuracy synchronization, but still have to measure relative delays between multiple GPS signals accurately. It is only within the recent decade that the cost of GPS receiver came down dramatically, making GPS affordable to more consumers.

The power or signal strength of a wave weakens as the receiver moves further away from the transmitter. If the distance between the transmitter and receiver is R, then the power density sensed by the receiver is given by the equation below:

$$S_u = \frac{P_s}{4 \cdot \pi \cdot R^2}$$

where $S_u$ is the received power density and $P_s$ is the power from the transmitter.

Many modern technologies make use of this phenomenon to perform distance detection. Radar is one of the most well known examples where a radar transmitter sends an electromagnetic wave, and measured the received power of the electromagnetic waves reflects off an object from the distance. In consumer electronic technology, various location detection techniques have been developed using Received Signal Strength (RSS) measurements of wireless signals such as cellular, Wifi and Bluetooth. For example, the Wifi Positioning Technology promoted by Google, Skyhook and Navizon uses measured RSS to known Wifi access points to determine the location of mobile devices (Skyhook).

The received power approach to location detection may have limiting factors, which can include:

1) Signal noise: noise from various sources such as electronic (thermal, shot, flicker) can degrade the accuracy of the measured RSS;

2) Interference: reflection and refraction of the wave can lead to less accurate measurement. In addition, if more than one transmitter shares the same frequency spectrum, then the crowding effect further degrades RSS measurement; and 3) Obstruction: if there is any obstruction between the transmitter and receiver, then the received power is no longer solely dependent on the distance, but also the extent of the obstruction.

In one embodiment, a system, comprising hardware and software, uses the TOA of high frequency sound waves (such as, for example, 19 KHz) for driver set location detection. In one embodiment, the present disclosure comprises software that functions as an application that can be installed on mobile devices, such as a smartphone, tablet, and etc. hardware is installed on the vehicle and consists of at microphones, speakers and an embedded processor. The present disclosure provides two methods of mobile device detection. In one embodiment, an active detection method, multiple microphones are placed inside the vehicle and are utilized to detect a high frequency sound signal emit by a mobile device. In another embodiment, a passive detection method, an audio signal emitted by multiple speakers installed in a car is detected by a mobile device.

DESCRIPTION OF THE FIGURES

The novel features of the various embodiments are set forth with particularity in the appended claims. The various embodiments, however, both as to organization and methods of operation, together with the advantages thereof, may be understood by reference to the following description taken in conjunction with the accompanying drawings as follows.

DETAILED DESCRIPTION

Figure 1:
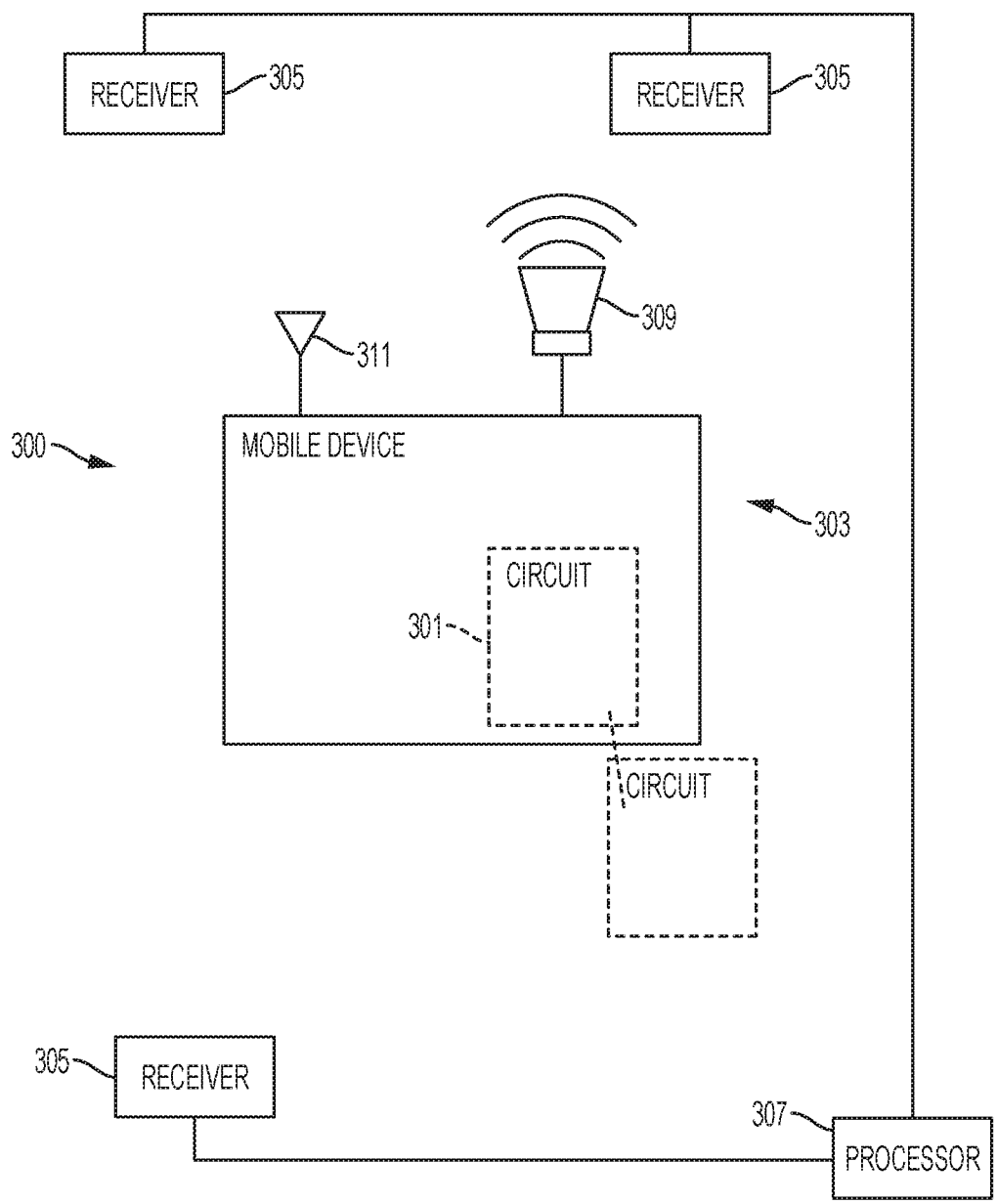
FIG. 1 is a diagram of a system for determining a presence of a mobile device located in a predetermined detection zone according to an embodiment of the present disclosure.

Various embodiments are described to provide an overall understanding of the structure, function, manufacture, and use of the devices and methods disclosed herein. One or more examples of these embodiments are illustrated in the accompanying drawings. Those of ordinary skill in the art will understand that the devices and methods specifically described herein and illustrated in the accompanying drawings are non-limiting embodiments and that the scope of the various embodiments is defined solely by the claims. The features illustrated or described in connection with one embodiment may be combined, in whole or in part, with the features of other embodiments. Such modifications and variations are intended to be included within the scope of the claims.

The present disclosure describes embodiments of an apparatus, system, and method for detecting the presence of a mobile device, such as a wireless device, in a predetermined detection zone and controlling or inhibiting operation of the mobile device when it is detected in the predetermined detection zone. In particular, the present disclosure is directed to embodiments of an apparatus, system, and method for detecting the presence of a mobile device such as a wireless device in a predetermined detection zone within a vehicle and disabling some or all of the functions of the mobile device when it is detected in the predetermined detection zone. More particularly, the present disclosure is directed to automatically preventing a person in the driver's seat of a vehicle from text messaging and doing other similar excessively dangerous activities using a mobile device.

It is to be understood that this disclosure is not limited to particular aspects or embodiments described, as such may vary. It is also to be understood that the terminology used herein is for the purpose of describing particular aspects or embodiments only, and is not intended to be limiting, since the scope of the apparatus, system, and method for detecting the presence of a mobile device within a predetermined zone within a vehicle and controlling the operation of the mobile device when it is detected is defined only by the appended claims.

In various embodiments, a mobile device may be implemented as a handheld portable device, computer, mobile telephone, sometimes referred to as a smartphone, tablet personal computer (PC), laptop computer, or any combination thereof. Non-limiting examples of smartphones include, for example, Palm® products such as Palm® Treo® smartphones (now Hewlett Packard or HP), Blackberry® smartphones, Apple® iPhone®, Motorola Droid®, and the like. Tablet devices include the iPad® tablet computer by Apple® and more generally a class of lightweight portable computers known as Netbooks. In some embodiments, the mobile device may be comprise, or be implemented as, any type of wireless device, mobile station, or portable computing device with a self-contained power source (e.g., battery) such as a laptop computer, ultra-laptop computer, personal digital assistant (PDA) with communications capabilities, cellular telephone, combination cellular telephone/PDA, mobile unit, subscriber station, user terminal, portable computer, handheld computer, palmtop computer, wearable computer, media player, pager, messaging device, data communication device, and so forth.

Accordingly, systems and methods of detecting the presence of the mobile device may vary based on the wireless technology communication standards used by the mobile device. Examples of wireless technology communication standards that may be used In the United States, for example, may include Code Division Multiple Access (CDMA) systems, Global System for Mobile Communications (GSM) systems, North American Digital Cellular (NADC) systems, Time Division Multiple Access (TDMA) systems, Extended-TDMA (E-TDMA) systems, Narrowband Advanced Mobile Phone Service (NAMPS) systems, 3G systems such as Wide-band CDMA (WCDMA), 4G systems, CDMA-2000, Universal Mobile Telephone System (UMTS) systems, Integrated Digital Enhanced Network (iDEN) (a TDMA/GSM variant) and so forth. A mobile device may also utilize different types of shorter range wireless systems, such as a Bluetooth system operating in accordance with the Bluetooth Special Interest Group (SIG) series of protocols, including Bluetooth Specification versions v1.0, v1.1, v1.2, v1.0, v2.0 with Enhanced Data Rate (EDR), as well as one or more Bluetooth Profiles, and so forth. Other examples may include systems using infrared techniques or near-field communication techniques and protocols, such as electromagnetic induction (EMI) techniques. An example of EMI techniques may include passive or active radio-frequency identification (RFID) protocols and devices. These wireless communications standards are understood by one of ordinary skill in the art.

Once an appropriate command or control signal is detected, operation of the mobile device may be controlled in one or more ways. For example, in one embodiment, the mobile device is associated with a control module that disables or inhibits the operation of at least one function of the mobile device and the mobile device is rendered either inoperable or operable only in a state of limited capacity. Accordingly, the control module may be able to either completely block the ability to receive or send a call on a mobile device, or sufficiently interfere with a function of the mobile device so as to make the mobile device usage undesirable. In embodiments, the control module may disable the operation of certain components or functions of the mobile device. For example, a keyboard portion of a mobile device may be disabled to prevent the user from using a text messaging function or an email function of the mobile device. In another embodiment, the control module may direct the operation of the mobile device to a hands-free operation. In another embodiment, outgoing communication functions may be inhibited, but incoming communication functions may be uninhibited. In another embodiment, automatic replies may be initiated during a period in which a function of the mobile device is inhibited.

In embodiments, the control module may be independent of the mobile device and may communicate with the mobile device on a primary communication channel of the mobile device only or in addition to one or more secondary channels. Further, in certain embodiments, the control module may be activated only if other logical conditions are met such as the state of the ignition system, a state of a gear box, or other sensors. Accordingly, a triggering condition may be the activation of a switch, such as the ignition switch of a vehicle, or deactivation of a "park" sensor of an automatic transmission of the vehicle, among other sensors. In embodiments, the control module may allow emergency functions, such as 911 calls, when active.

In embodiments, a command or control signal may be localized to other areas within the vehicle so that operation of a mobile device in that area is disabled, but leaving other mobile devices outside of that area operational. In various embodiments, the power level of a command or control signal may be configured such that the command or control signal is delivered precisely to the predetermined detection zone. In one embodiment, this may be implemented with a directional antenna located within the vehicle where the signal is delivered to precisely the predetermined detection zone.

In embodiments described herein, a predetermined detection zone may be defined as a three-dimensional zone within or in proximity of a driver seat in a vehicle. A predetermined detection zone may be a zone within a vehicle, such as a passenger car; however, the predetermined detection zone need be within a vehicle and may be any predetermined zone as appropriate. For instance, the predetermined detection zone may be an area within a room in a building.

In one embodiment of a theory of the present disclosure, which may be referred to as active detection, a method for determining a presence of a mobile device located in a predetermined detection zone, comprises transmitting, by the mobile device, an acoustic signal, receiving, at each of a plurality of acoustic receivers, the acoustic signal transmitted from the mobile device, determining, by a processor, a location of the mobile device based on the received acoustic signal, determining whether the location of the mobile device matches the predetermined detection zone, and inhibiting at least one function of the mobile device upon determining that the location of the mobile device matches the predetermined detection zone. The method may further comprise monitoring a communication channel for a control or a command signal and inhibiting the at least one function of the mobile device upon reception of the control or command signal. According to one embodiment, the communication channel may be a Bluetooth channel or any other connection that is secondary to the primary cellular communication channel.

An embodiment of an active detection system for determining a presence of a mobile device located in a predetermined detection zone is shown in FIG. 1. The system 300 comprises a circuit 301 associated with a mobile device 303, a plurality of acoustic receivers 305, and an electronic device 307, such as a processor, configured to determine a location of the mobile device 303. The circuit 301 may be configured to cause an acoustic signal to be transmitted from the mobile device 303. In one embodiment, the acoustic signal may be output from a speaker 309 of the mobile device at high volume via a speaker 309 of the mobile device 303. Further, each of the plurality of receivers 305 may be configured to receive the acoustic signal transmitted from the mobile device 303 and convert the acoustic signal into an electrical signal. Additionally, the processor 307 may be configured to determine the location of the mobile device based on the time of reception of the acoustic signal by the plurality of acoustic receivers 305 and to determine whether the location of the mobile device 303 matches the predetermined detection zone. As shown in the embodiment of FIG.

1, the circuit 301 may be located within the mobile device 303 or it may be communicatively coupled to the mobile device 303 such that control and/or command signals can be exchanged between the circuit 301 and the mobile device 303.

Furthermore, in embodiments, the circuit 301 may comprise a control module associated with the mobile device 303, where the control module 301 is coupled to a non-transitory memory that stores executable instructions, wherein the control module 301 is operable to execute the instructions stored in the memory. The control module may be operable to execute the instructions to cause an acoustic signal to be transmitted from the mobile device 303 to a plurality of acoustic receivers 305, receive a command signal from a processor 307 configured to determine a location of the mobile device 303 based on the time of reception of the acoustic signal by the plurality of acoustic receivers 305 and determine whether the location of the mobile device 303 matches the predetermined detection zone, and inhibit at least one function of the mobile device 303 upon reception of the command signal. In one embodiment, the control module 301 may be located within the mobile device. In another embodiment, the circuit may be in communication with the mobile device through a communication network, such as a wireless communication network.

The control module 301 may be configured to inhibit the at least one function of the mobile device 303 upon the processor 307 determining that the location of the mobile device matches the predetermined detection zone. The control module 301 may also be configured to redirect at least one function of the mobile device 303 to a hands-free alternate system upon the processor 307 determining that the location of the mobile device 303 matches the predetermined detection zone.

In embodiments, the system 300 may use the Time of Arrival (TOA) of the acoustic signal for detection of the mobile device 303 and to determine whether the mobile device is in a driver side location of a vehicle. The acoustic signal may comprise at least one sonic pulse, which may be an ultrasonic pulse. In one embodiment, the at least one ultrasonic pulse is transmitted at a range of about 15 KHz to about 60 KHz. In another embodiment, the at least one ultrasonic pulse is transmitted at a range of about 10 KHz to about 21 KHz. In a further embodiment, the at least one ultrasonic pulse is transmitted at about 19 KHz. Using a narrow-bandwidth 19 KHz acoustic pulse or beep may allow for aggressive digital filtering to attenuate background noise. Furthermore, a narrow-bandwidth 19 KHz acoustic pulse or beep may improve localization sensitivity over a range of frequencies since a wider bandwidth may contain more noise in a pass band directed to such a range of frequencies. Additionally, using a narrow-bandwidth 19 KHz acoustic pulse or beep may allow for transmission at a lower acoustic volume.

Once a determination is made by the processor 307 as to whether the mobile device 303 is within the predetermined detection zone, the processor 307 may cause a signal to be sent to the mobile device 303 for inhibiting a function of the mobile device 303. The signal may be received via an antenna 311 of the mobile device 303. The antenna 311 may be a component of the primary communication scheme of the mobile device 303 or a component of a secondary communication scheme of the mobile device, such as Bluetooth. Once an appropriate signal is received, operation of the mobile device may be controlled in one or more ways. For example, in one embodiment, the mobile device 303 is associated with control module 301 that disables or inhibits the operation of at least one function of the mobile device 303. Thus the mobile device 303 is rendered either inoperable or operable only in a state of limited capacity. Accordingly, the control module 301 may be able to either completely block the ability to receive or send a call on a mobile device 303, or sufficiently interfere with a function of the mobile device 303 so as to make the mobile device 303 usage undesirable. In embodiments, the control module 301 may disable the operation of certain components or functions of the mobile device. For example, a keyboard portion of a mobile device 301 may be disabled to prevent the user from using a text messaging function or an email function of the mobile device. In another embodiment, the control module 301 may alter the operation of one or more functions of the mobile device, for example directing the operation of the mobile device 303 to a hands-free operation. In another embodiment, outgoing communication functions may be inhibited, but incoming communication functions may be uninhibited. In another embodiment, automatic replies may be initiated during a period in which a function of the mobile device 303 is inhibited.

In embodiments, the processor 307 may be coupled to a non-transitory memory that stores executable instructions, and the processor 307 may be operable to execute the instructions. The processor 307 may be operable to execute the instructions to receive a plurality of a electrical signals from the plurality of acoustic receivers 305, where each electrical signal is based on an acoustic signal received by each of the plurality of acoustic receivers 305, to determine a location of the mobile device 303 based on the time of reception of the acoustic signal by the plurality of acoustic receivers 305, and to determine whether the location of the mobile device 303 matches the predetermined detection zone. In one embodiment, the processor 307 is operable to determine the location of the mobile device 303 based on a distance from the mobile device 303 to each of the plurality of acoustic receivers 305. Further, the processor 307 may be operable to determine the distance of the mobile device 307 to each of the plurality of acoustic receivers 305 based on a time difference in reception at each of the plurality of acoustic receivers 305 of the acoustic signal, where the acoustic signal is transmitted from the mobile device 305. Further, in embodiments, components or functions of the processor 307 may be part of or performed by the mobile device 303. Accordingly, the mobile device may receive a communication signal from the processor 307 that provides information regarding a time of reception of an acoustic signal at each of the plurality of acoustic receivers 305.

In embodiments where the processor is independent of the mobile device, the battery drain on the mobile device may be lower if signal processing is performed on dedicated hardware powered by a separate power source, such as a vehicle power source. The processor may also be operable to receive a Bluetooth signal transmitted by the mobile device and to transmit a signal to the mobile device. In one embodiment, a Bluetooth Simple Serial Profile SSP may be used to provide a communication signal to the mobile device.

Figure 2:
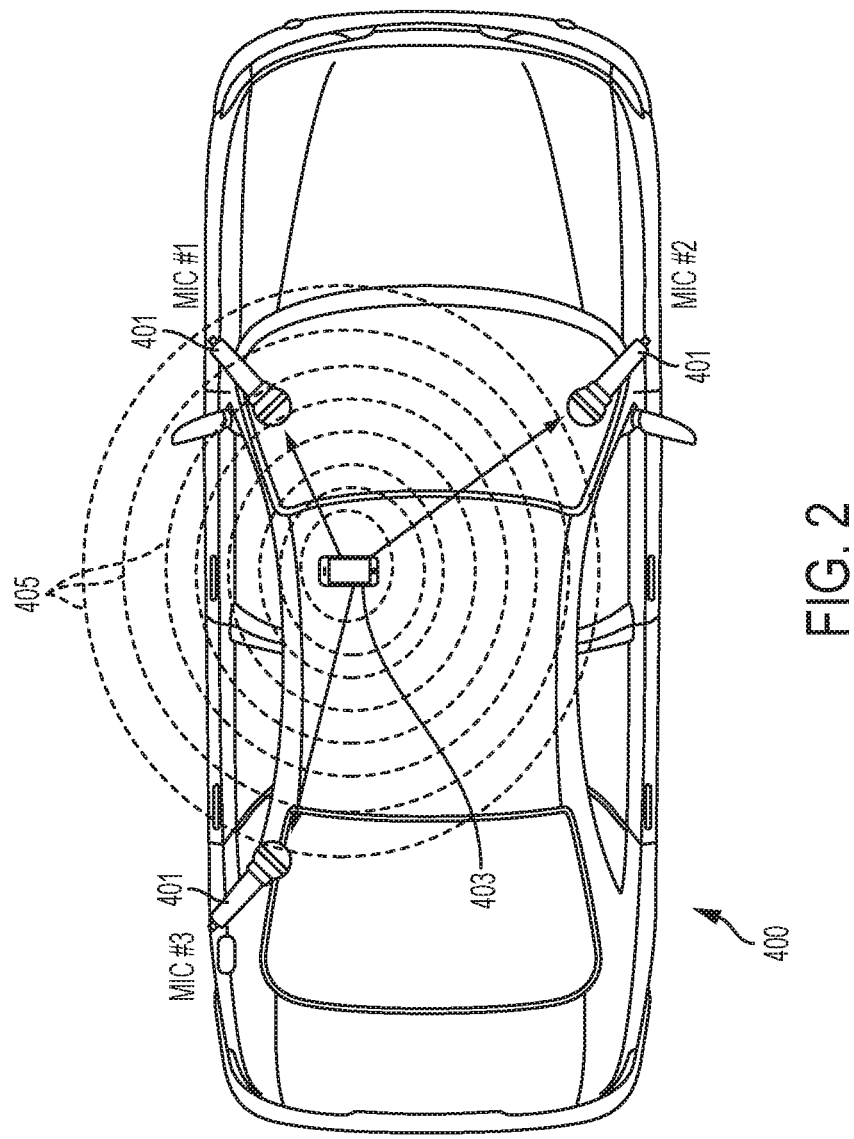
FIG. 2 is an illustration of an array of microphones installed inside of a vehicle.

In one embodiment, the plurality of acoustic receivers comprises an array of microphones. The array 401 may be installed in multiple locations inside a cabin of a vehicle 400 as shown in FIG. 2. The system 300 may be configured to listen for an acoustic signal 405, such as a plurality of ultrasonic pulses through the array of microphones 401. Because the distances of the microphones 401 to the mobile device 403 are different, the ultrasonic pulses 405 will arrive at each microphone 401 at a different time. In one embodiment, the arrival time of a pulse is detected using a fixed threshold for initial detection and then applying an optimization routine to obtain a best estimate of the arrival time. Accordingly, the distance of the mobile device 403 to each of the microphones 401 can be calculated from a relative time difference. Once the distances are known, the location of the mobile device 401 can be determined. In one embodiment, the location is determined via triangulation. Additionally, the system 300 may be used to detect multiple mobile devices simultaneously using the components and methods disclosed herein.

In one embodiment, an acoustic receiver, such as a microphone, may implement a high pass filter before an amplifier of the microphone so that most of the sound energy such as conversation, music, road noise below the frequency of the acoustic signal, such as 19 KHz will be filtered. The high pass filter may ensure that the microphone amplifier does not enter saturation state when an area where the location of the microphone, such as a vehicle cabin, is very noisy because if the microphone amplifier enters saturation state, a location of mobile device may be able to be detected reliably. Furthermore, background noise removal may be accomplished by first estimating an amount of background noise and then removing the background noise from the audio signal to prevent erroneous detection.

Additionally, in embodiments, fade in and fade out may be applied at the beginning and the end of a transmission of an acoustic signal to minimize popping and whopping sounds caused by the instantaneous charging and discharging of the speaker coil when a high-volume sound is suddenly played on the speaker. In another embodiment, the system may adjust for temperature and humidity effect in the calculation of a physical distance of a mobile device based on speed of sound, which change based on humidity and temperature change in the environment.

In embodiments, the systems and methods of the present disclosure may comprise components that are hardware, software, or combinations thereof. In one embodiment, the software may be an application that is able to be installed on a mobile device, such as a smartphone, tablet, etc. In embodiment, a mobile application may be configured to run on mobile devices such as Android devices, iPhone and various wearable devices.

Advantages of a systems and methods of the present disclosure include:

1) Availability of Ultrasound Friendly Speaker on Smartphone—Because of a consumer's expectation of high fidelity sound from the speaker of a mobile device, such as a smart phone, many mobile devices come equipped with high performance speaker that can output a high volume of ultrasound.

2) Minimal software processing on a mobile device—In embodiments where the processor-intensive location detection algorithm is carried out independent of the mobile device, minimum resource may be required for a software application on a mobile device. This allows the system to run on devices that have constrained processor and battery resources, such as for example Google Glass, smart watch, and low-end smart phones.

3) Robustness—In embodiments where a system/method implements a time of first arrival, the system/method is less prone to the distortion introduced by obstruction, reflection and multi-path effect.

4) Low Interference—Most audio interferences inside a car cabin have frequency much less than about 19 KHz. Road, engine and wind noises are in the hundreds of Hz, human conversation centers around 5 KHz, and music rarely exceeds about 13 KHz. Because of the minimal interference in the high frequency audible range, the system/method may be able to achieve better signal to noise ratio, and thus better detection success rate.

5) Unobtrusiveness—Most adult human beings cannot hear frequency above about 15 KHz. In one embodiment, a short sound pulse (1/10 s of a second) emitted by the system should be imperceptible to most drivers and passengers.

In embodiments of active detection, the acoustic signal received by the acoustic receivers is converted to an electrical signal and the electrical signal comprises information regarding the acoustic parameters of the acoustic signal. In embodiments, signal processing is performed on the electrical signal to determine a location of mobile device. In embodiments, the systems and methods of the present disclosure may comprise a sound player, a sound recorder, and/or a sound filter that perform particular functions of the necessary signal processing. In embodiments, the signal processing components and functions described for active detection may be implemented in the same or similar fashion in embodiments of passive detection described below with regard to FIG. 5 and associated descriptions.

It may be recognized, however, that active detection methods may include features that may be difficult to implement.

For example, the active detection method may not be robust for localization of multiple phones. It may be necessary for each phone to encoded specific identification information in the sound it emits. Alternatively, each phone may have to coordinate with hardware in the vehicle through another communication method (Bluetooth, wifi and etc) and take turns to emit the sound (Round Robin fashion) with other phones located in the vehicle. Such methods may require significant engineering efforts.

Additionally, in the active detection method, the hardware must constantly monitor the acoustic environment of the vehicle because the ultrasonic pulse emitted by the mobile device may occur at any time. The hardware in the vehicle therefore needs to be capable of fast and sensitive sound recording and processing. One or more high performance microphones, amplifiers and/or processors may be required for installation in the vehicle. Some exemplary candidates for the processor may include an ARM Cortex M4F processor configured to operate at least 100 M Hz or faster. The cost of processor alone is $8~12 at volume. Because a vehicle OEM may have to add at least 2 microphones and provision significant processing capability, this method may be difficult to implement in the vehicle.

Figure 3:
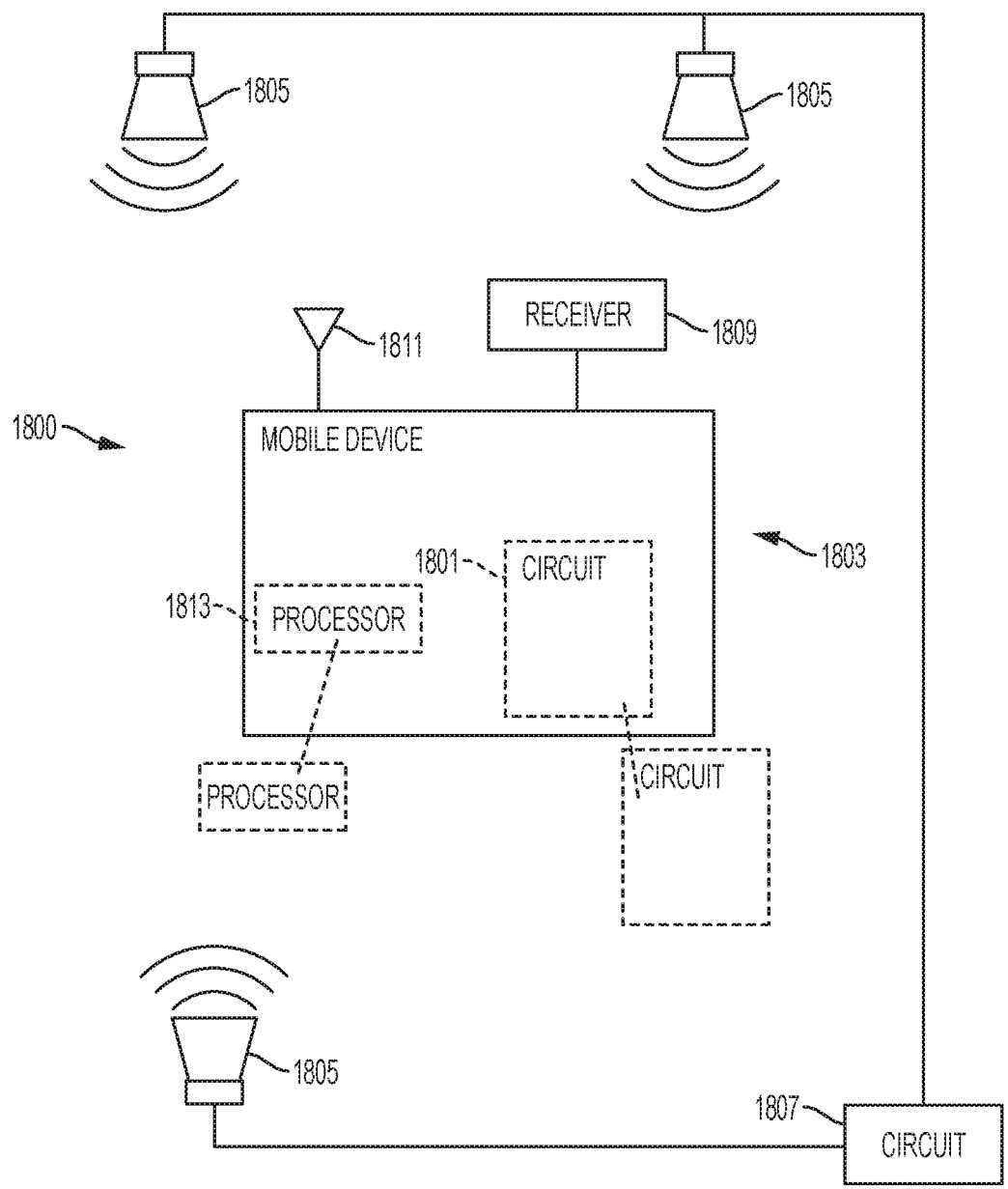
FIG. 3 is a diagram of a system for determining a presence of a mobile device located in a predetermined detection zone according to an embodiment of the present disclosure.

As shown in FIG. 3, in one embodiment of a theory of the present disclosure, which may be referred to as passive detection, a system 1800 for determining a presence of a mobile device located in a predetermined detection zone comprises a plurality of transmitters 1805, where each of the plurality of transmitters 1805 is configured to transmit an acoustic signal into an acoustic environment within the vehicle, a mobile device 1803 configured to receive each acoustic signal transmitted by the plurality of transmitters 1805, and a processor 1813 configured to determine a location of the mobile device 1803 based on the acoustic signals transmitted by the plurality of transmitters 1805 and received by the mobile device 1803 and to determine whether the location of the mobile device 1803 matches the predetermined detection zone. In some embodiments, the transmitters 1805 may comprise speakers that that form a portion of a sound system of the vehicle. The processor 1813 may also be configured to cause the mobile device 1803 to inhibit at least one function of the mobile device 1803 upon determining that the location of the mobile device 1803 matches the predetermined detection zone.

It may be understood that the acoustic environment may comprise all sound signals within the environment of the mobile device. The sound signals within the acoustic environment may include infrasonic sounds (in some embodiments, sounds having a frequency less than about 20 Hz), audible sounds (in some embodiments, sounds ranging from about 20 Hz to about 20 KHz), and ultrasonic sounds (in some embodiments, sounds having a frequency greater than about 20 KHz). In some embodiments, ultrasonic sounds may also refer to sounds having a frequency greater than about 10 KHz or a frequency greater than about 15 KHz, which may include sounds at the high frequency end of the audible sound spectrum.

In embodiments, the system 1800 may use the Time of Arrival (TOA) of the acoustic signal for detection of the mobile device 1803 and to determine whether the mobile device 1803 is in a driver side location of a vehicle. The acoustic signal may comprise at least one sonic pulse, which may be an ultrasonic pulse. In one embodiment, the at least one ultrasonic pulse is transmitted in a range of about 15 KHz to about 60 KHz. In another embodiment, the at least one ultrasonic pulse is transmitted at a range of about 10 KHz to about 21 KHz. In a further embodiment, the at least one ultrasonic pulse is transmitted at about 19 KHz. Using a narrow-bandwidth 19 KHz acoustic pulse or beep may allow for aggressive digital filtering to attenuate background noise. Furthermore, a narrow-bandwidth 19 KHz acoustic pulse or beep may improve localization sensitivity over a range of frequencies since a wider bandwidth may contain more noise in a pass band directed to such a range of frequencies. Additionally, using a narrow-bandwidth 19 KHz acoustic pulse or beep may allow for transmission at a lower acoustic volume. Although the center frequency of such a band pass filter may be set to about 19 KHz, it may be understood that frequencies within a neighborhood of about 19 KHz (such as between about 18 KHz and about 20 KHz) may also be allowed through the filter passband. For some applications, a passband may range from about 18 KHz to about 20 KHz. In other applications, the passband may range from about 18.9 KHz to about 19.1 KHz. It may be understood that the width of the passband may be set to a narrow range for improved noise immunity, or may be set to a wider range to allow the acoustic pulse to be transmitted using frequency modulation or frequency hopping techniques.

The system 1800 may also comprise circuit 1801 may be configured to inhibit at least one function of the mobile device 1803. The processor 1813 may be in communication with the circuit 1801 of the mobile device. As shown in the embodiment of FIG. 3, the circuit 1801 may be located within the mobile device 1803 or it may be communicatively coupled to the mobile device 1803 such that control and/or command signals can be exchanged between the circuit 1801 and the mobile device 1803. Similarly, as shown in the embodiment of FIG. 3, the processor 1813 may be located within the mobile device 1803 or it may be communicatively coupled to the mobile device 1803 such that information may be exchanged between the processor 1813 and the mobile device 1803.

Furthermore, in embodiments, the circuit 1801 may comprise a control module associated with the mobile device 1803, wherein the control module 1801 is coupled to a non-transitory memory that stores executable instructions and wherein the control module 1801 is operable to execute the instructions stored in the memory. The control module 1801 may be operable to receive a command signal from a processor 1813 and inhibit at least one function of the mobile device 1803 upon reception of the command signal. As shown in FIG. 3, in one embodiment, the control module 1801 may be located within the mobile device 1803. In another embodiment, the control module 1801 may be in communication with the mobile device through a communication network, such as a wireless communication network. The control module 1801 may also be configured to inhibit the at least one function of the mobile device 1803 upon the processor 1813 determining that the location of the mobile device 1803 matches the predetermined detection zone. The control module 1801 may also be configured to redirect at least one function of the mobile device 1803 to a hands-free alternate system upon the processor 1813 determining that the location of the mobile device 1803 matches the predetermined detection zone.

During embodiments of passive detection, each transmitter 1805 may be configured to emit an acoustic signal into the acoustic environment of the vehicle in which each acoustic signal comprises short pulse of a high frequency (ultrasonic) sound signal. The mobile device 1803 may be configured to capture the acoustic signal via an acoustic receiver 1809, such as a microphone of the mobile device 1803. The processor 1813 may be configured to calculate a time-of-flight of the acoustic signal and determine a location of the mobile device 1803 in reference to a predetermined detection zone based on the time-of-flight.

Once a determination is made by the processor 1813 as to whether the mobile device 1803 is within the predetermined detection zone, the processor 1813 may cause a signal to be sent to the mobile device 1803 to inhibit a function of the mobile device 1803. The signal may be received via an antenna 1811 of the mobile device 1803 if the processor 1813 is not a component of the mobile device 1803. Once an appropriate signal is received, operation of the mobile device 1803 may be controlled in one or more ways. For example, in one embodiment, the mobile device 1803 is associated with control module 1801 that disables or inhibits the operation of at least one function of the mobile device 1803. Thus the mobile device 1803 is rendered either inoperable or operable only in a state of limited capacity. Accordingly, the control module 1801 may be able to either completely block the ability to receive or send a call on a mobile device 1803, or sufficiently interfere with a function of the mobile device 1803 so as to make the mobile device 1803 usage undesirable. In embodiments, the control module 1801 may disable the operation of certain components or functions of the mobile device. For example, a keyboard portion of a mobile device 1801 may be disabled to prevent the user from using a text messaging function or an email function of the mobile device. In another embodiment, the control module 1801 may alter the activity of one or more functions of the mobile device 1801, for example directing the operation of the mobile device 1803 to a hands-free operation. In another embodiment, outgoing communication functions may be inhibited, but incoming communication functions may be uninhibited. In another embodiment, automatic replies may be initiated during a period in which a function of the mobile device 1803 is inhibited.

In embodiments, the processor 1813 may be coupled to a non-transitory memory that stores executable instructions, and the processor 1813 may be operable to execute the instructions. The processor 1813 may be operable to execute the instructions to receive the electrical signals from an acoustic receiver 1809 of the mobile device 1803, where each electrical signal is based on each acoustic signal received by the acoustic receivers 1809, to determine a location of the mobile device 1803 based on the time of reception of the acoustic signals by the acoustic receiver 1809, and to determine whether the location of the mobile device 1803 matches the predetermined detection zone. In one embodiment, the processor 1813 is operable to determine the location of the mobile device 1803 based on a distance from the mobile device 1803 to each of the plurality of acoustic transmitters 1805. Further, the processor 1813 may be operable to determine the distance of the mobile device 1803 to each of the plurality of acoustic transmitters 1805 based on a time difference in transmission from each of the plurality of acoustic transmitters 1805 of the acoustic signals. In one embodiment, the processor 1813 is a mobile application processor. Further, in one embodiment, the processor 1813 may be located within the mobile device and in another embodiment the processor 1813 may be independent of the mobile device 1803 and communicatively coupled to the mobile device 1803. Further, in embodiments, components or functions of the processor 1813 may be part of or performed by the mobile device 1803. Accordingly, the mobile device may receive a communication signal from the processor 1813 that provides information regarding a time of reception of each acoustic signal at the acoustic receivers 1809 of the mobile device 1803

Figure 4:
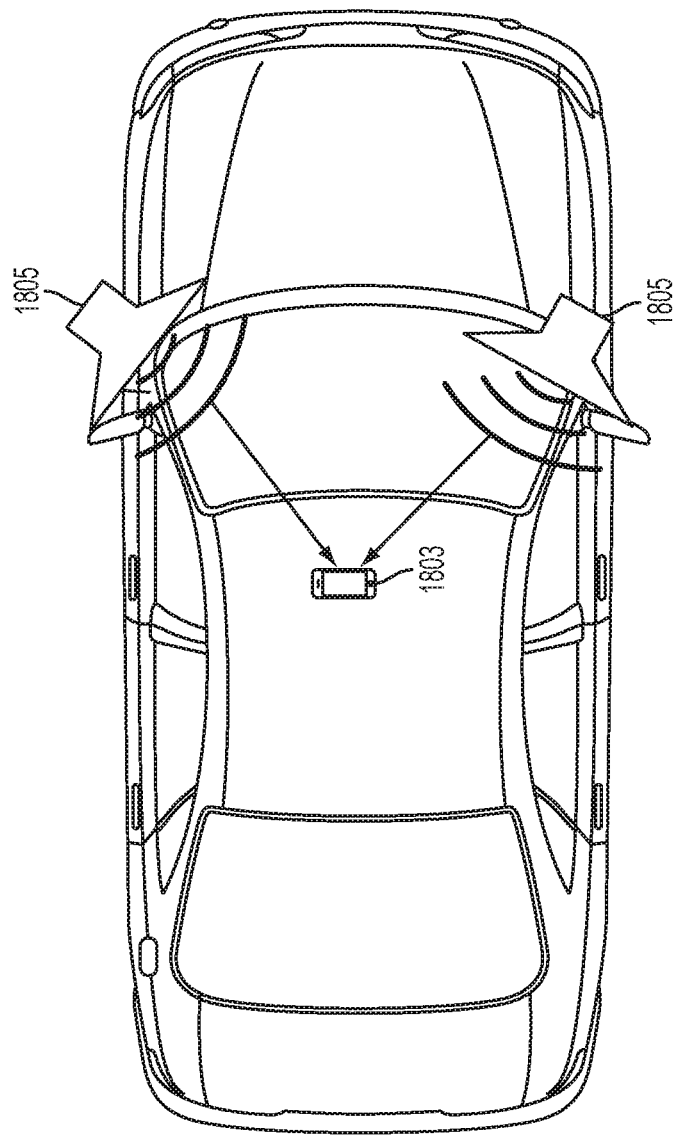
FIG. 4 is an illustration of two speakers installed inside of a vehicle.

The plurality of transmitters 1805 may be a plurality of acoustic transmitters, such as speakers, located inside of a cabin of a vehicle. One embodiment of a location of the speakers 1805 is shown in FIG. 4. The speakers 1805 may be dedicated and integrated with the vehicle when the vehicle is manufactured, or the speakers may be added to the vehicle. In one embodiment, the speakers 1805 may be dedicated speakers that optimized for high frequency sounds transmission. In one embodiment, the speakers 1805 may be a special type of loudspeaker (usually dome or horn-type) designed to produce high audio frequencies, such as a Tweeter. In one embodiment, as depicted in FIG. 4, the system 1800 may employ two speakers 1805. In alternative embodiments, three or more speakers may be implemented to provide ultrasonic pulses or pings. In some embodiments, the speakers may be located, as indicated in FIG. 4, at or near the ends of the dashboard. In alternative embodiments, the speakers may be located closer to each other. In one example, the speakers may be separated by a smaller distance such as by about 24 inches, about 18 inches, about 12 inches, or about 6 inches.

In addition, a method for determining a presence of a mobile device located in a predetermined detection zone comprises transmitting a sequence of acoustic pulses through multiple acoustic transmitters, for example a plurality of speakers 1805. Each pulse may be transmitted at about 19 KHz and may be separated from another pulse by a pre-defined time delay. The sound received by the acoustic receiver of the mobile device 1803 may be recorded. The acoustic signal from each speaker is identified and the time difference between each pulse is analyzed. Based on the time difference between the pulses, a relative distance is calculated to each speaker and a determination is made as to whether the mobile device is in the driver zone or not.

A sound player within the vehicle may periodically play a sound file comprising the acoustic signal that contains 19 KHz audio acoustic pulses through the speakers. In one embodiment, a sound file may be configured to cause the speakers to emit pulses, or beeps, that are about 10 milliseconds long and are about 19 KHz sinusoidal signals separated by about 190 ms of silence between the pulses. In some alternative examples, the pulse width can range from about 1 ms to about 500 ms. The pulse-width may be kept as short as possible so that more pulses may be transmitted in each time period. The lower bound on pulse-width may be set by the characteristics of the audio receiver in the mobile device: if the pulse-width is too short, there may not be sufficient sound energy to be registered by the microphone. In some embodiments, it has been determined that a pulse width ranging from about 5 ms to about 10 ms may provide a strong enough signal to be registered by the microphone, while being short enough to permit multiple pulses per seconds. The period of silence between ultrasonic pulses may also be configurable. A lower boundary, for example of about tens of milliseconds, may be determined based on the reverberation of the pulse. The period of silence may be long enough so that all echoes from a prior pulse may have already died down. In some embodiments, the period of silence between ultrasonic pulses has been set to about 50 ms to about 200 ms. A long period silence may not be ideal, because it may reduce the number of ultrasonic pulses transmitted in any time period. This sound file may be recorded using about a 44.1 KHz sampling rate and 32-bit floating number format.

There are several mechanisms by which the sound file may be introduced into the sound system of the vehicle to cause the vehicle sound system to emit the acoustic signal. In one embodiment, the in-vehicle audio system may use a software mixer routine to add the acoustic signal into the audio signal that will eventually be played through the speaker. In an exemplary embodiment, for better localization accuracy, the acoustic signal may be sourced by only the front two speakers, for example by one or more tweeters. In another embodiment, the acoustic signal may be added to a source of music, such as through mixing the acoustic signal into existing CD, digital audio/video, streaming audio and video. In another embodiment, the acoustic signal may be added to a radio, Satellite, TV or Internet audio and/or video broadcast. In yet another embodiment, the acoustic signal may be added to software (such as iPhone, Android or vehicle software app) that generates any audio or video output. In one example, an iPhone or other connected device may source the acoustic signal via a USB connection to play through in-vehicle audio system. In another example, an iPhone or other connected device source the acoustic signal via a Bluetooth Audio connection to play through in-vehicle audio system. In yet another embodiment, encryption or other security technique may be incorporated into the acoustic signal to prevent an unauthorized party from replicating or reverse engineering the acoustic signal.

The introduction of an audio file comprising the acoustic signal from an extra-vehicular source into a pre-existing vehicle audio system may have several advantages. Such advantages may include:

The audio ping can be easily integrated into existing audio system, including a sound system, a music player, a radio broadcast, a stream-audio, and video.

The cost of integrating the system into a new vehicle is virtually zero.

There may be a faster time to market because the acoustic signal can be quickly incorporated into existing music broadcast and streaming infrastructure without requiring new hardware.

Additionally, software developed to detect an acoustic signal may be designed to detect specific characteristics of a signal supplied from an extra-vehicular source. For example, a cell phone may include an audio file of an acoustic signal having specific characteristics such as ultrasonic pulse frequency, ultrasonic pulse phase, ultrasonic pulse wave shape or envelope, acoustic signal period, or acoustic signal duty cycle. Such a file may be downloaded to a sound system of a vehicle for playback as disclosed above. Software in the cell phone may be specifically designed to recognize the characteristics of the acoustic signal supplied by the audio file, thereby improving signal discrimination over background.

It may be recognized that the passive localization method may be affected by music, noise, conversation, or other external audio signals that may match the characteristics of the acoustic signal and lock the phone (audio interference). Audio interference may be addressed in several ways, including, but not limited to:
- increasing the power of the acoustic signal;
- applying directional transmission techniques to the acoustic signal;
- applying frequency hopping techniques in which the frequency of the ultrasonic pulse is varied;
- changing additional acoustic characteristics of the acoustic signal, including a duty cycle of the acoustic signal (the period of latency between ultrasonic pulses), a period of the acoustic signal, a frequency of the ultrasonic pulse, an amplitude of the ultrasonic pulse, a phase of the ultrasonic pulse, or combination or combinations thereof.

It may further be recognized that any of the above disclosed characteristics may be periodically altered in a manner analogous to the use of a rotating key in encryption technology. In another alternative, a sound file comprising the acoustic signal may be encrypted to prevent replication or reverse engineering.

In embodiments, the acoustic signal received by the acoustic receiver of the mobile device may be converted to an electrical signal and the electrical signal comprises information regarding the acoustic parameters of the acoustic signal. In embodiments, processing is performed on the electrical signal to determine a location of mobile device. In embodiments, the systems and methods of the present disclosure may comprise a sound player, a sound recorder, and/or a sound filter as described with regard to FIG. 5 that perform particular functions of the necessary signal processing. Furthermore, the signal processing components and functions described may be implemented by a processor device located within the mobile device or by a processor device in communication with the mobile device.

However, in the passive detection method, the mobile device must constantly monitor the acoustic environment of the vehicle because the ultrasonic pulse emitted by the transmitters may occur at any time. As a result, the processor may run continuously in order to evaluate the acoustic environment and detect the occurrence of one or more ultrasonic pings. Such continual higher processor activity may lead to battery drain. Several mechanisms may be incorporated into the passive localization method to address the issue of power consumption including, without limitation:
- introducing a wait or sleep period in the detection routine, for example monitoring the acoustic environment of the electronic device only periodically (for example, monitoring or recording the acoustic environment for 1 second and then sleep for 9 seconds), thereby detecting the acoustic environment only 10% of the time and saving battery power for the 90% of the time;
- developing the software code for the mobile device that makes use of software packages optimized for low power-consumption (for example, writing the software using a C/C++ library such as Android NDK (Native Development Kit) which would be more power efficient than using Java Android Library (Android SDK));
- offloading a portion of the software to specialized hardware that is optimized for low power consumption, such as DSP, Audio Codec;
- running the software at lower processor speed or frequency;
- running the software at lower power gating option for the processor;
- disabling external electronic component such as microphone amplifier and audio codec when the software is not actively listening for the sound (or causing such components to enter a sleep mode); or
- any combination or combinations of the above techniques.

Figure 5:
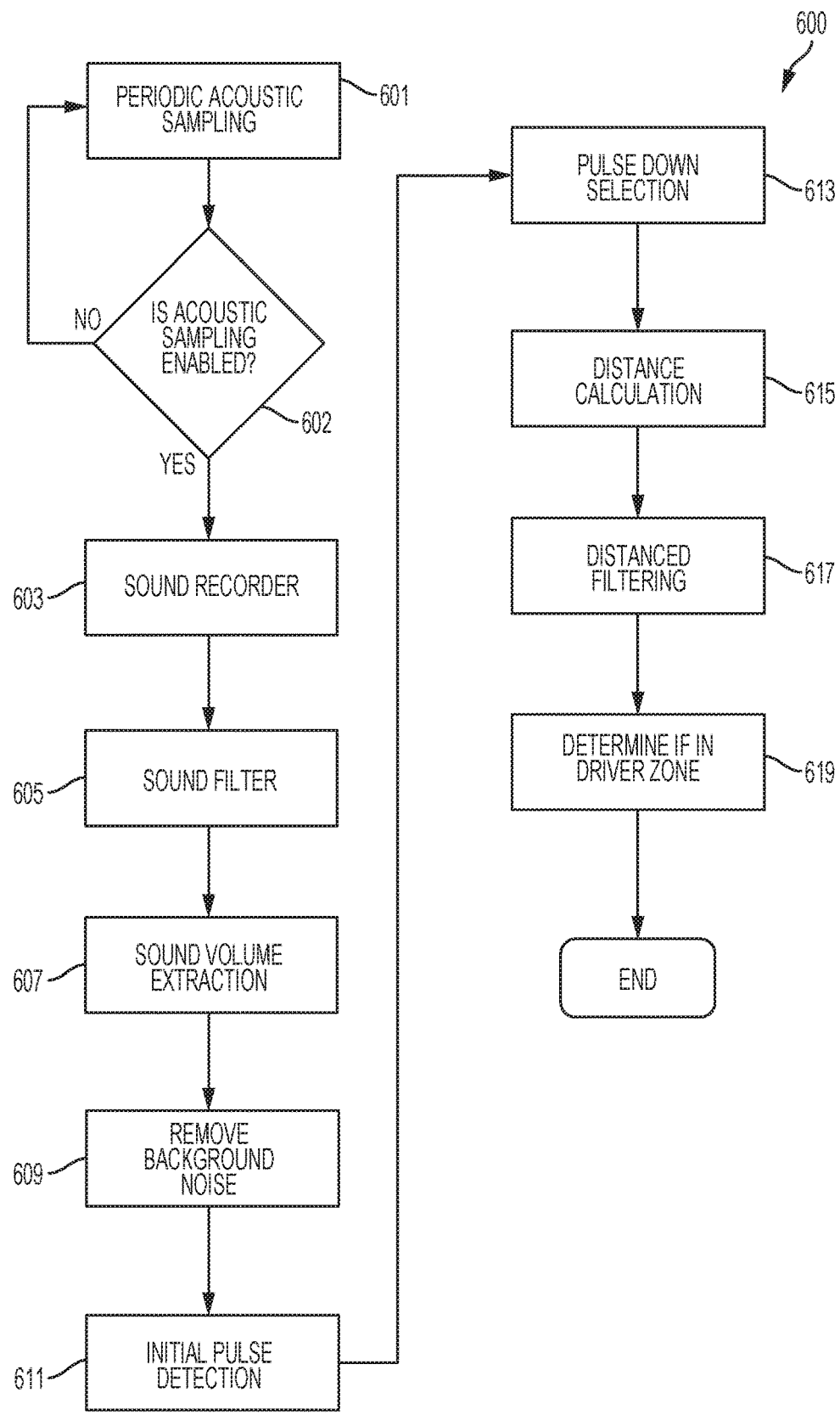
FIG. 5 is a flowchart of a method of processing an acoustic signal according to one embodiment of the present disclosure.

An embodiment of a passive method for mobile device localization that addresses the issue of continual evaluation of the acoustic environment of the vehicle by the mobile device is shown in FIG. 5.

In the method 600 depicted in FIG. 5, a mobile device may periodically sample 601 its acoustic environment. It may be recognized that during the periodic sampling step 601, the acoustic transmitters of the vehicle emit the acoustic signals as disclosed above. In some embodiments, the vehicle sound system may be configured to transmit acoustic signals while the vehicle engine is running. In alternative embodiments, the vehicle sound system may be configured to transmit the acoustic signals while the vehicle is in motion. In one example, the vehicle sound system may be configured to cease transmission of the acoustic signals when the vehicle is stopped or parked.

In some embodiments, the mobile device may follow an acoustic sampling protocol to sample the acoustic environment 601 for a period of about 1 sec. and remain disabled for about 9 secs. Such a sampling protocol may be described has having a sampling protocol frequency of about 0.1 Hz with a sampling protocol duty cycle of about 10%. Alternative sampling protocols may have a sampling protocol frequency of about 0.5 Hz to about 0.01 Hz with a sampling protocol duty cycle of about 5% to about 30%. If acoustic sampling by the mobile device is disabled 602, the mobile device takes no further actions. If acoustic sampling by the mobile device is enabled 602, the mobile device may be configured to enable a sound recorder 603 to capture a short recording from an acoustic receiver at a predetermined sampling frequency. In one embodiment, the sampling frequency is about 44.1 KHz. In an alternative embodiment, the sampling frequency may be greater, for example at about 100 KHz. Further, in an embodiment, the recorded audio is converted to an array of double precision floating number for further analysis. Example code of an embodiment for capturing a recording is shown below:

```
it frequency = 44100;
int blockSize = 22050;
int channelConfiguration = AudioFormat.ChANNEL_IN_MONO;
int audioEncoding = AudioFormat.ENCODING_PCM_16BIT;
```

```
audioRecord = new AudioRecord(MediaRecorder.AudioSource.CAMCORDER, frequency,
channelConfiguration, audioEncoding, blockSize * 2);
// start recording until explicitly stopped
while (getNoCommApplication( ).isListeningSounds( )) {
  recData = new ByteArrayOutputStream( );
  dos = new DataOutputStream(recData);
  short[ ] buffer = new short[blockSize];
  audioRecord.startRecording( );
  int bufferReadResult = audioRecord.read(buffer, 0, blockSize);
  for (int i = 0; i < bufferReadResult; i++) {
    try {
      dos.writeShort(buffer[i]);
    } catch (IOException e) {
      e.printStackTrace( );
    }
  }
}
audioRecord.stop( );
try {
  dos.flush( );
  dos.close( );
} catch (IOException e1) {
  e1.printStackTrace( );
}
byte[ ] clipData = recData.toByteArray( );
ByteBuffer rawByteBuffer = ByteBuffer.wrap(clipData);
rawByteBuffer.order(ByteOrder.BIG_ENDIAN);
double[ ] micBufferData = new double[clipData.length / 2];
for (int i = 0; i < clipData.length; i += 2) {
  short sample = (short) ((clipData[i] << 8) + clipData[i + 1]);
  micBufferData[i / 2] = (double) sample / 32768.0;
}
```

Further, at step 605, a sound filter may apply a narrow band-pass filter centered at about 19 KHz to emphasis the acoustic signal. In one embodiment, the sound filter comprises a Butterworth Infinite Impulse Response filter (Butterworth-type IIR filter). Example code for a Butterworth-type IIR filter is shown below:

```
private IirFilterCoefficients filterCoefficients;
private IirFilter filter;
filterCoefficients = new IirFilterCoefficients( );
filterCoefficients.a = new double[ ] { 1.0000000000000000E+0,
  1.7547191342863953E+0, 9.3451485937250567E-1 };
filterCoefficients.b = new double[ ] { 2.5671973749246350E-2,
  0.0000000000000000E+0, -2.5671973749246350E-2 };
filter = new IirFilter(filterCoefficients);
double[ ] filterOutput = new double[micBufferData.length];
for (int i = 0; i < micBufferData.length; i++) {
  filterOutput[i] = filter.step(micBufferData[i]);
}
```

Further, an IIR filter is one embodiment of a plurality of different embodiments of filter implementations. Depending on a particular operating system of a mobile device, a software library, and/or a particular hardware resource; a type of IIR and/or Finite Impulse Response (FIR) filter may be chosen as appropriate.

In one embodiment, an acoustic receiver, such as a microphone, records the acoustic signal as oscillations around the 0-axis. A volume value, which is always greater or equal to 0, may be extracted from the sound recording at step 607 for the purpose of efficient analysis. Sound volume extraction may be done by calculating the 7-elements moving average of the absolute values of the sound volume. Example code of an embodiment for sound volume extraction is shown below:

```
double soundVolume[ ] = new double[filterOutput.length];
for (int i = 6; i < filterOutput.length; i++) {
  soundVolume[i] = Math.abs(filterOutput[i]) +
  Math.abs(filterOutput[i - 1])
    + Math.abs(filterOutput[i - 2]) + Math.abs(filterOutput[i - 3])
    + Math.abs(filterOutput[i - 4]) + Math.abs(filterOutput[i - 5])
    + Math.abs(filterOutput[i - 6]);
}
```

In an alternative embodiment, a less processor intensive algorithm may be used to calculate the sound volume based on a 2-element moving average. Such an algorithm may increase the speed of the calculation as only two stored values may be used instead of seven. An example code of such an embodiment for a 2-element moving average may include:

soundVolume[$i$]=max[abs(soundInput[$i$]),abs(soundInput[$i-1$])]

Due to possible interference, filtering artifacts, electronic noise and transducer distortions, it may be necessary to remove background noise from the volume data at step 609. To remove background noise, a fixed threshold may be applied to each element of the volume data. If the volume data is less than the threshold, it may be assigned a value of 0. Example code of applying a threshold to volume data is shown below:

```
private final double NOISE_MAX_VOLUME = 0.05;
for (int i = 0; i < soundVolume.length; i++) {
  // If sound volume < NOISE_MAX_VOLUME, then set volume to 0,
  if (soundVolume[i] < NOISE_MAX_VOLUME) {
    soundVolume[i] = 0.0;
  }
}
```

Sounds with an energy level that is significantly higher than the background noise, which may be referred to as pulses, beeps, or peaks, and are potential candidates for identifying pulses at step 611. The method for the pulse detection may be a fixed threshold technique according to the example code shown below:
C++ Psuedo Code
double noise_free_volume[ ]; //input
int initial_cross_over_points[ ]; //output, time index where volume first change from zero to non-zero.

```
int i,j=0;
for (i=1;i<sizeof(noise_free_volume);i++) {
    if (noise_free_volume[i-1]==0 && noise_free_volume[i]>0) {
        initial_cross_points[j]=i;
        j++;
    }
}
```

Below is example code that may be implemented for pulse detection:

```
for (int i = 0; i < soundVolume.length; i++) {
    if (soundVolume[i] < NOISE_MAX_VOLUME) {
        continue;
    }
    int j = 0;
    double max = 0;
    for (j = i; j < soundVolume.length; j++) {
        if (soundVolume[j] > max)
            max = soundVolume[j];
        if (soundVolume[j] < NOISE_MAX_VOLUME) {
            j++;
            break;
        }
    }
    int count = j - i;
    if (max < NOISE_TRESHHOLD) {
        for (j = 0; j < count; j++) {
            soundVolume[i + j] = 0.0;
        }
    } else {
        double peakTreshold = 0.1 * max;
        for (j = 0; j < count; j++) {
            if (soundVolume[i + j] >= peakTreshold) {
                peaks.add(i + j);
                soundVolume[i + j] = -1.0;
                break;
            }
        }
    }
    i += count - 1;
}
```

A process of initial pulse detection performed at step 611 may produce a list of time stamps of sound pulses. As part of a previous step, the list may be filtered by eliminating sound pulses that are very close to or very far from earlier pulses according to a pulse down selection process performed at step 613. In one embodiment, if a time difference between a pulse and a preceding pulse or a proceeding pulse is not in a range specified by a minimum and maximum value, then the pulse may be eliminated from the list of time stamps. Accordingly, if a pulse is not within a predetermined range, it may be determined to be a reverberation of an earlier pulse instead of a new pulse. Example code for determining time differences of pulses in the list is shown below:

```
if (peaks.size( ) > 1) {
    List<Integer> differences = new ArrayList<Integer>( );
    int i, j=0;
    for (i = 0; i < peaks.size( ); i++) {
```

```
        for (j=i; j<peaks.size( );j++)
        {
            int diff = peaks.get(j) - peaks.get(i);
            if (diff >= minDist && diff >= maxDist) {
                int distInSamples = diff - midDist;
                double dist = distInSamples * (34 / 44.1);
                double time = diff / 44.1;
                differences.add(diff);
                break;
            }
        }
    }
```

According to the embodiments disclosed above for method steps 605, 607, 609, 611, and 613, the processor may determine if the sound recorded in step 603 of the acoustic environment of the mobile device comprises the acoustic signals transmitted by the transmitters. When the recording is determined to comprise the acoustic signals transmitted by the transmitter, the relative location of the mobile device may then be calculated using the speed of sound in step 615 using the following formula:

$$\text{Relative Distance(cm)} = -0.5 * 34.3 \frac{\text{cm}}{\text{s}} \cdot (\text{length of silence between pings} - 190 \text{ ms})$$

$$\text{Relative Distance(cm)} = -0.5 * 34.3 \frac{\text{cm}}{\text{s}} \cdot (189.2066 - 190) = -14 \text{ cm}$$

Example code of an embodiment for calculating a relative location of a mobile device is shown below:

```
it distInSamples = diff - midDist;
double dist = distInSamples * (34 / 44.1);
double time = diff / 44.1;
```

The value "34" shown above is the speed of sound in cm/ms. The value "44.1" is the number of audio samples in 1 millisecond at the sampling frequency of 44.1 KHz. In alternative embodiments, the sampling frequency may be higher, for example at about 100 KHz. In such alternative embodiments, the code may be changed so that the value "44.1" is replaced by "100" or other value related to the sampling frequency.

In addition, there are many sources of error that might lead to incorrect calculated distance from time to time. To eliminate statistical outliers, distance filtering may be applied at step 617 based on a calculated distance that may be averaged over current values and a finite set of historical values. A moving average process may improve the accuracy at the expense of slower detection speed (~10 seconds). Example code below illustrates one embodiment of a moving average filtering calculation:

```
if (!differences.isEmpty( )) {
    int sumDiff = 0;
    for (int diff : differences) {
        sumDiff += diff;
    }
    int averageDiff = sumDiff / differences.size( );
```

Ultimately, a determination is made as to whether a mobile device is located in a predetermined detection zone in step 619; such as a driver's zone. For the implementation shown above, a mobile device may be considered to be in a predetermined detection zone when a relative position is greater than 0. In an embodiment, this means if a relative placement is to the left of a mid-point of a vehicle cabin, then a mobile device may be determined to be in a driver's seat location. Example code of an embodiment for determining a relative position is shown below:

```
private void calculateDeviceDistance( ) {
    int sum = 0;
    for (Peaks setOfPeaks : setsOfPeaks) {
        sum += setOfPeaks.getDifferenceInSamples( );
    }
    int average = sum / setsOfPeaks.size( );
    int differenceFromMiddle = average - midDist;
    int differenceInSamples = Math.abs(differenceFromMiddle);
    double positionInCm = differenceInSamples * (34 / 44.1);
    if (differenceFromMiddle > 0) {
        sendLockDeviceMessage( );
    } else {
        sendUnlockDeviceMessage( );
    }
}
```

Alternative embodiments may use different criteria to determine that the mobile device is located in the predetermined detection zone. According to alternative calculations, if the calculated relative distance is less than zero, then the mobile device is determined to be in the predetermined detection zone (the driver's side).

Once the position of the mobile device is determined, the control circuit may cause an inhibition of one or more functions of the mobile device if the position is found to be in the predetermined detection zone. Functions that may be inhibited may include texting functions or functions related to internet communications. In one example, the function of the mobile device may be altered, for example configuring voice communications to employ a hands-free system incorporated in the vehicle.

In one embodiment, the mobile device may continue to periodically sense the acoustic environment and determine the position of the mobile device even after the control circuit has inhibited the one or more functions of the mobile device. In an alternative embodiment, a timer associated with the mobile device may be implemented so that the mobile device may discontinue sensing the acoustic environment and determining the position of the mobile device until the timer runs out. In either embodiment, the at least one function of the mobile device may be restored when the mobile device determines that it is no longer located within the predetermined detection zone.

In addition, various embodiments of the sound filter discussed above with regard to step 605 of FIG. 5 are described below. In embodiments, analog electronic components such as capacitor, resistor, inductors and amplifiers can be used to build band pass filter. Infinite impulse response (IIR) and finite impulse response (FIR) are two common types of digital filters. Depending on a particular mathematical equation, the following filters can be used to produce the desired band pass properties:

Butterworth;
Chebyshev;
Bessel; or
Elliptical.

There are also many popular circuit implementations of various band pass filters, including:

Sallen-Key filter;
State Variable filter;
Biquadratic (Biquad) filter;
Multiple Feedback Bandpass filter; and
Dual Amplifiers Band-Pass (DAPB) filter.

Further, embodiments of sound filters may be implemented using a microprocessor Field Programmable Gate Array (FPGA) or a Digital Signal Processor (DSP).

Additionally, embodiments of sound volume extraction discussed above are described below. A demodulation process used by Amplitude Modulation (AM) radio receiver may be used for extracting sound volume from an ultrasonic pulse. Accordingly, various analog implementations of an AM radio demodulator may be used to extract the volume information from a 19 KHz ultrasonic carrier frequency. The following is a list of AM demodulation techniques:

Envelope detector consisting of rectifier and low pass filter;
Crystal demodulator; and
Product detector.

In addition, a Hibert Transform may be used for volume extraction. Further, a dedicated Application Specific Integrated Circuit, or ASIC semiconductor chip, may be used to detect the volume level from audio signal. One example is a THAT 2252 RMS-Level Detector chip manufactured by THAT Corporation.

Moreover, embodiments of pulse detection as discussed above are described below. Pulse detection may be considered as a problem studied across various academic fields. The operation may be to separate out a true signal, which is referred to as a ping, from noise. One embodiment of pulse detection functions to separate a ping from noise is when the volume information exceeds fixed multiples of the background noise. Another embodiment of pulse detection according to the present disclosure involves using a Cumulative Sum (CUSUM) chart. The CUSUM may be used to discern significant deviation from natural variability in continuous evolving process. In addition, an Otsu threshold can be applied to identify a ping (foreground) from noise (background). The algorithm assumes that an acoustic signal follows a bi-modal histogram consists of ping (foreground) and noise (background). By dividing each time slice into two groups (ping and noise), while minimizing the variance within each group, a ping may be identified reliably even with varying noise level.

Additionally, one or more of the steps depicted in FIG. 5 may be substituted in whole or in part using a time delay cross correlation technique or phase correlation. A relative delay, or phase shift, of the acoustic signals received at each microphone can be calculated using phase correlation. Once the phase shifts of the microphones are determined, the relative placement of the acoustic source can be determined.

The following steps illustrate the calculation of phase correlation between the acoustic data from two microphones, s1 and s2:

Calculate a Fourier transform of both time-series acoustic signals s1, s2 (S1 and S2, respectively);
Calculate a complex conjugate of a second Fourier transformed signal, S2, and then multiply it with S1 to calculate a cross-power spectrum R;
Apply an inverse Fourier transform to R (resulting in signal r); and
The phase shift is calculated as a peak in r due to the Fourier-shift theorem.

Once phase shift has been determined, the relative location can be calculated by multiplying the phase shift by the speed of sound.

Figure 6:
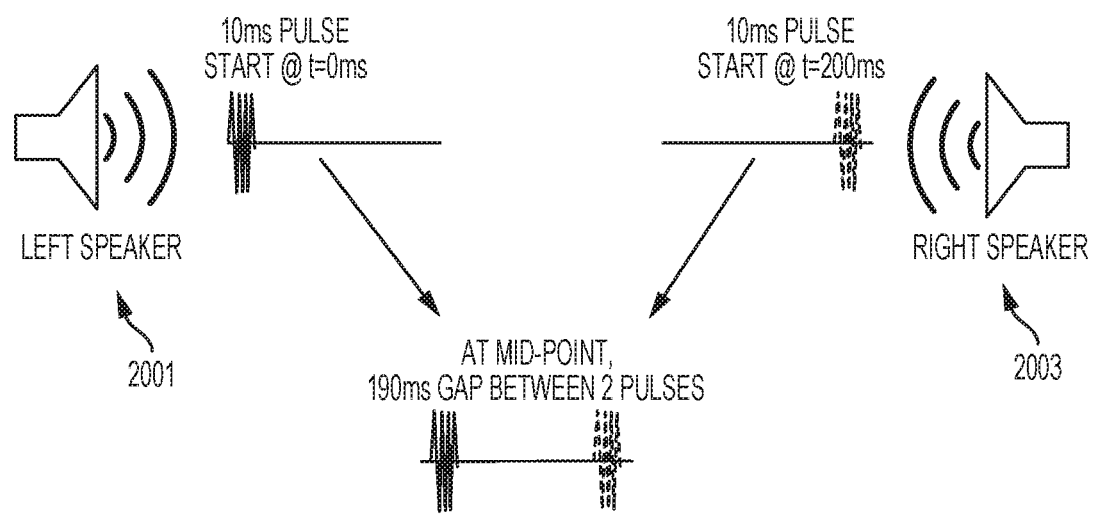
FIG. 6 is an illustration of a calculation process for determining a relative location of a mobile device according to an embodiment of the present disclosure.

In passive detection of a relative location of a mobile device can be calculated using the speed of sound. The following illustrates one embodiment of a calculation process. In the example of FIG. 6, two speakers are shown, a left speaker 2001 and a right speaker 2003. At time $t_0=0$, the left speaker 2001 emits a pulse. At time $t_0+t_{pulse}+t_{silence}=200$ ms, the right speaker 2003 emits a pulse. $t_{silence}$ is set to equal 190 ms.

The mid-point between the two speakers 2001, 2003 is a distance of m from each speaker. The mobile device is calculated to be a distance of d right of the center point between left and right speaker 2001, 2003. The speed of sound is v. The distance of the mobile device to the right speaker 2003 is (m−d). Distance of the mobile device to the left speaker 2001 is (m+d).

For the first pulse from the left speaker, it will be:

First detected at $t = 0 + (m + d)/v$ (rising edge of the $1^{st}$ pulse)

Last detected at $t = t_{pulse} + (m + d)/v$ (falling edge of the $1^{st}$ pulse)
$$= 10 + (m + d)/v$$

For the second pulse from the right speaker, it will be:

First detected at $t = 0 + t_{pulse} + t_{silence} + (m − d)/v$ (rising edge of the $2^{nd}$ pulse)
$$= 0 + 10 + 190 + (m + d)/v = 200 + (m − d)/v$$

Last detected at $t = 0 + t_{pulse} + t_{silence} + t_{ulse} + (m + d)/v$ (falling edge of the $2^{nd}$ pulse)
$$= 210 + (m − d)/v$$

The silence between the two pulses, specifically, from the falling edge of the $1^{st}$ pulse to the rising edge of the $2^{nd}$ pulses is measured:

$$T_{silence} = \text{falling edge of } 2^{nd} \text{ pulse} − \text{rising edge of } 1^{st} \text{ pulse}$$
$$= 200 + (m − d)/v − (10 + (m + d)/v)$$
$$T_{silence} = 190 − 2d/v$$
$$T_{silence} − 190 = −2d/v$$
$$−0.5*(T_{silence} − 190)*v = d$$

Therefore, the relative distance d from the center point can be calculated by finding the small shift in the silence period between the two pulses.

Relative Distance(cm) =
$$−0.5*34.3\frac{\text{cm}}{\text{s}} \cdot (\text{length of silence between pings} − 190 \text{ ms})$$

Relative Distance(cm) =
$$−0.5*34.3\frac{\text{cm}}{\text{s}} \cdot (189.2066 − 190) = −14 \text{ cm}$$

In the above example, the relative placement is −14 cm, or 14 cm to the right of the midpoint between the two speakers 2001, 2003. The calculations disclosed above are examples only as they relate to acoustic signals having the timing characteristics as depicted in FIG. 6. It may be understood that related calculations may be used for signals having different timing characteristics such as pulse width, length of silence between pulses, and pulse frequency.

In the embodiments disclosed above, the calculations for the location of the mobile device are referenced to a predetermined detection zone corresponding to a driver's side of a vehicle. In many of the sample calculations disclosed above, the driver's side of the vehicle is taken to be the left side of the vehicle (corresponding to jurisdictions having right-hand traffic laws, such as in the U.S.). Thus, in the calculation of the relative distance disclosed above, a negative value may correspond to an area outside of the driver's side such as the forward passenger side. It may be understood that equivalent embodiments, methods, and calculations may apply to vehicles having a right side corresponding to the driver's side of the vehicle (for jurisdictions having left-hand traffic laws, for example in the U.K.). In such embodiments, for example, a negative value of the relative distance may correspond to the predetermined detection zone corresponding to the driver's side of the vehicle.

Additionally, a method for determining a presence of a mobile device located in a predetermined detection zone comprises transmitting, by each of a plurality of transmitters, acoustic signals to the mobile device, receiving, by the mobile device, each acoustic signal transmitted by the plurality of transmitters, determining, by a processor, a location of the mobile device based on the communication signals transmitted by the plurality of transmitters and received by the mobile device, determining whether the location of the mobile device matches the predetermined detection zone, and inhibiting at least one function of the mobile device upon determining that the location of the mobile device matches the predetermined detection zone. Each of the acoustic signals comprises at least one ultrasonic pulse at about 19 kHz.

Further, determining the location of the mobile device may comprise determining the location of the mobile device based on a distance from the mobile device to each of the plurality of receivers and the distance of the mobile device to each of the plurality of receivers is may be determined based on time difference in reception at each of the plurality of receivers of the acoustic signal transmitted from the mobile device. Additionally determining the location of the mobile device comprises determining the location of the mobile device based on triangulation.

In addition, an acoustic signal may be transmitted by a plurality of acoustic transmitters with additional location or identification information that allows each of the acoustic transmitters to be identified based on information contained in the acoustic signal. In one embodiment, information is encoded using pulse compression by modulating the transmitted acoustic signal and then correlating the received signal with the transmitted acoustic signal. The modulated acoustic signal may be transmitted according to certain parameters such that signal processing is accomplished the same as or similar to the processes described above.

As disclosed above, a mobile device may be localized within a vehicle based on the receipt, by the device, of one or more audio signals emitted by one or more transmitters within the vehicle. In one embodiment of a method, a mobile device periodically records sounds from its acoustic environment and processes data derived from the recorded sounds. The mobile device may then determine from the data that the recorded sounds comprise the audio signals, and then use timing information from the audio signals to determine the position of the mobile device within the vehicle. It may be recognized that, in some embodiments, both the periodic sampling by the mobile device and the emission of the audio signals by the transmitters may be free-running and uncorrelated processes. Consequently, it is possible that the mobile device may begin recording the environment at a time between the transmission of the audio signal from a first transmitter and the transmission of the audio signal from the second transmitter. Unless the audio signal from the first transmitter (the first audio signal) can be distinguished from the audio signal from the second transmitter (the second audio signal), the software within the mobile device may invert the sense of the transmitter and therefore incorrectly calculate its location. Therefore, in one embodiment, the first audio signal and the second audio signal may be distinguished according to one or more audio characteristics.

Figure 7:
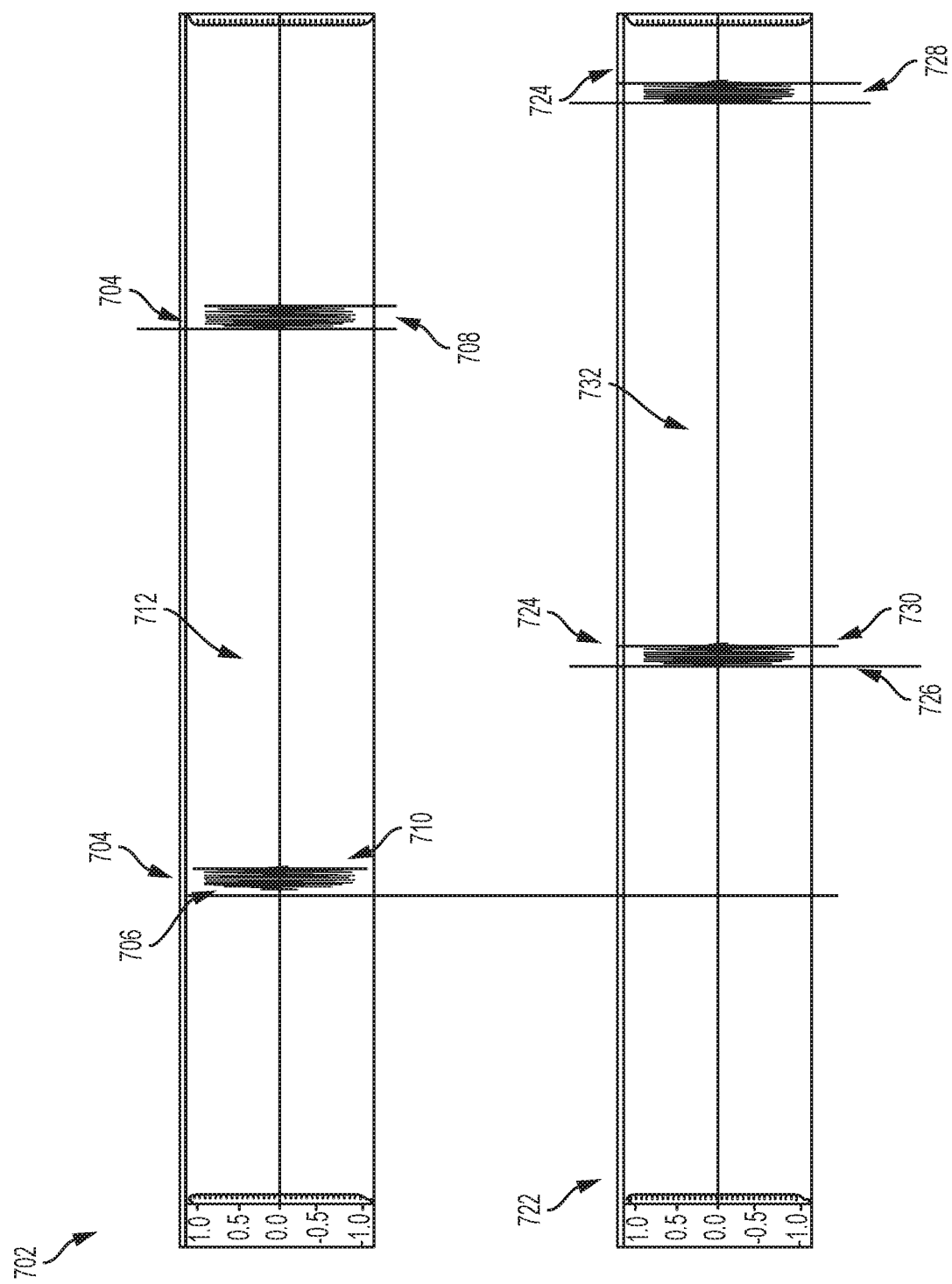
FIG. 7 is an illustration of acoustic signals transmitted by a first transmitter and a second transmitter.

FIG. 7 depicts a representation of a first audio signal 702 and a second audio signal 722. The first audio signal 702 may include an ultrasonic pulse 704 starting at a time $t_0$ 706 and ending at a time $t_1$ 710. The ultrasonic pulse 704 may therefore have a pulse width $w_1$ defined as the difference between time $t_0$ 706 and time $t_1$ 710. Ultrasonic pulse 704 may be followed by a refractory or silent period 712 having a time width of $w_2$, corresponding to the difference in time between the start of a subsequent ultrasonic pulse 704 and the ending time $t_1$ of a previous ultrasonic pulse 704. The ultrasonic signal 702 may therefore be characterized by a period $T_1$ comprising a sum of pulse width $w_1$ and refractory period width $w_2$. Additionally, the first audio signal 702 may be characterized by a duty cycle $D_1$ calculated as $(w_1/T_1)*100$ (percentage of the period $T_1$ during which the ultrasonic pulse 704 is emitted).

The second audio signal 722 may be similarly characterized as audio signal 702. The second audio signal 722 may include an ultrasonic pulse 724 starting at a time $t_2$ 726 and ending at a time $t_3$ 730. The ultrasonic pulse 724 may therefore have a pulse width $w_3$ defined as the difference between time $t_2$ 726 and time $t_3$ 730. Ultrasonic pulse 724 may be followed by a refractory or silent period 732 having a time width of $w_4$, corresponding to the difference in time between the start of a subsequent ultrasonic pulse 724 and the ending time $t_3$ of a previous ultrasonic pulse 724. The second ultrasonic signal 722 may therefore be characterized by a period $T_2$ comprising a sum of pulse width $w_3$ and refractory period width $w_4$. Additionally, the second audio signal 722 may be characterized by a duty cycle $D_2$ calculated as $(w_3/T_2)*100$ (percentage of the period $T_2$ during which the ultrasonic pulse 724 is emitted). The second audio signal 722 may be emitted with a delay time $t_{d1}$ with respect to the first audio signal 702. A delay time $t_{d1}$ may be calculated as the time between the start 706 of an ultrasonic pulse 704 in the first audio signal 702 and the start 726 of a subsequent ultrasonic pulse 724 in the second audio signal 722 (or a difference between $t_2$ and $t_0$). An alternative delay time $t_{d2}$ may be calculated as the time between the start 726 of an ultrasonic pulse 724 in the second audio signal 722 and the start 706 of a subsequent ultrasonic pulse 704 in the first audio signal 702 (or a difference between $t_0+w_1+w_2$ and $t_2$ of a preceding ultrasonic pulse 724.) It may be recognized that the first audio signal 702 may be distinguished from the second audio signal 722 according to differences in the timing characteristics of the signals. For example, the first audio signal 702 may have a pulse width $w_1$ longer or shorter than the pulse width $w_3$ of the second audio signal 722. Alternatively, the first audio signal 702 may have a refractory period $w_2$ longer or shorter than the refractory period $w_4$ of the second audio signal 722. In another example, the first audio signal 702 may have a duty cycle $D_1$ longer or shorter than the duty cycle $D_2$ of the second audio signal 722. In yet another example, delay time $t_{d1}$ may be longer or shorter than delay time $t_{d2}$. In some embodiments, the period $T_1$ of the first audio signal 702 and the period $T_2$ of the second audio signal 722 may both be about 125 msec. However, delay time $t_{d1}$ may be about 50 msec. and the delay time $t_{d2}$ may be about 75 msec. In this manner, the first audio signal 702 and the second audio signal 722 may be distinguished regardless of when the mobile device begins sampling the acoustic environment.

Figure 8:
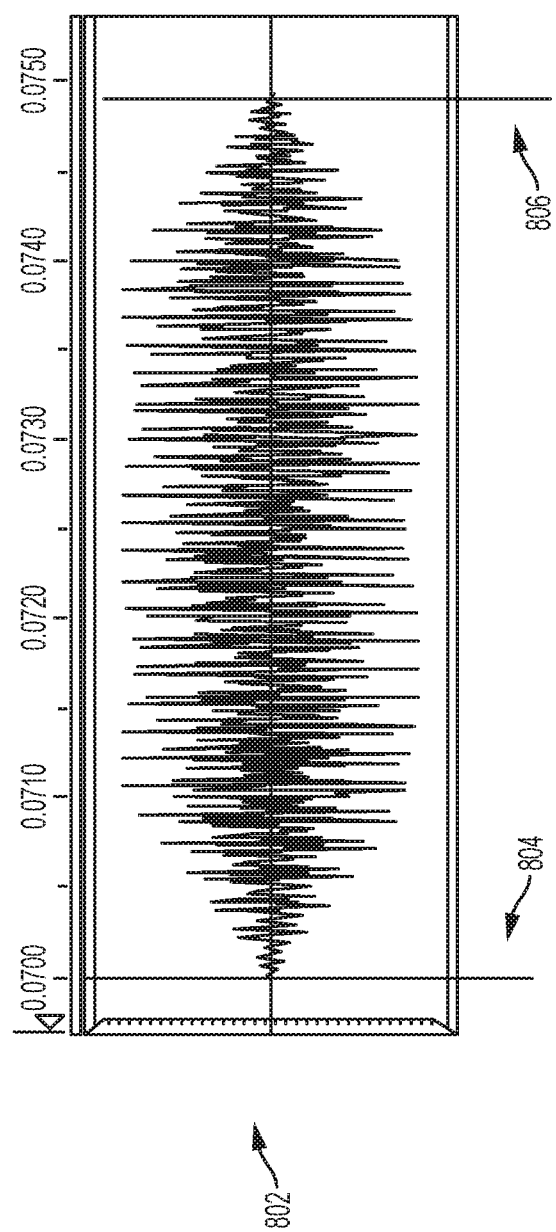
FIG. 8 is an illustration of a ultrasonic pulse incorporated into an acoustic signal transmitted by a transmitter.

In addition to the characteristics of a first and a second audio signal disclosed above, each audio signal may be characterized according to the central frequency of the ultrasonic pulse and/or a wave envelope of the ultrasonic pulses. FIG. 8 depicts and expanded view of an ultrasonic pulse 802 that may be incorporated into either the first or the second audio signal. An ultrasonic pulse 802 may be characterized as having a starting time $(t_5)$ 804 and an ending time $(t_6)$ 806. The ultrasonic pulse 802 may be further characterized by a pulse width $w_5$ equal to the difference between $t_6$ and $t_5$. The ultrasonic pulse 802 may be characterized as having a pulse wave envelope describing the amplitude of the ultrasonic pulse 802 throughout its pulse width $w_5$. In some examples, the ultrasonic pulse 802 may be characterized by essentially a flat amplitude throughout the pulse width $w_5$. In other examples, the amplitude of the ultrasonic pulse 802 may be shaped throughout the pulse width $w_5$. As an example of amplitude shaping, the ultrasonic pulse 802 may ramp up in amplitude from about a zero amplitude to a maximum amplitude over a first 1 msec. period, may remain essentially at the maximum amplitude for about 3 msec., and may ramp down in amplitude from the maximum amplitude to about a zero amplitude for an additional 1 msec., thereby forming a trapezoidal pulse envelope. Other amplitude shaping may include a triangular pulse envelope, a curved pulse envelope, a parabolic pulse envelope, a sinusoidal pulse envelope, or a combination or combinations thereof. It may be recognized that a first audio signal may be distinguished from a second audio signal based on the respective ultrasonic pulse envelopes therein.

It may be recognized that the location of a mobile device within a vehicle may be localized only in terms of a left side of the vehicle versus a right side of the vehicle when only two speakers are used (for example, the speakers are installed in the front of the vehicle). Such one dimensional localization (across a width dimension of the vehicle cabin) may be sufficient for a vehicle having only a front driver seat and a front passenger seat. However, such a system may be insufficient to localize a mobile device in a driver's seat for a vehicle having front and rear seats (or more than one rear seat, as may be found in some vans). The mobile device may be located in two dimensions (along the width and length of the vehicle cabin) if additional positioning information is provided. In one example, additional positioning information may be determined based on the power of the acoustic signal received by the mobile device. As disclosed above, the power or signal strength of a wave weakens as the receiver moves further away from the transmitter. If the distance between the transmitter and receiver is R, then the power density sensed by the receiver is given by the equation below:

$$S_u = \frac{P_s}{4 \cdot \pi \cdot R^2}$$

where $S_u$ is the received power density and $P_s$ is the power from the transmitter. Thus, the location of the mobile device within the vehicle cabin may be determined in a length dimension of the vehicle cabin based on measuring a value of the power density of the acoustic signals emitted by the speakers.

Figure 9:
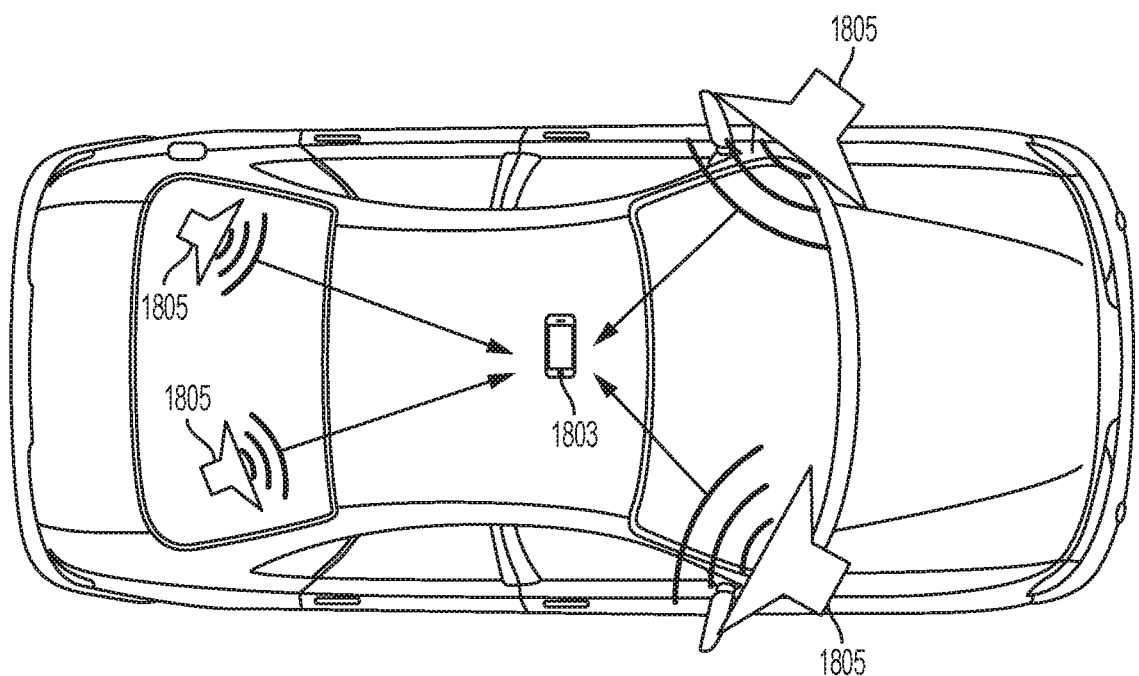
FIG. 9 is an illustration of a plurality of speakers installed inside of a vehicle.

FIG. 9 illustrates an alternative embodiment for determining a two dimensional localization of the mobile device 1803 within the vehicle cabin. FIG. 9 is distinguished from FIG. 4 in that more than two speakers 1805 are deployed in the vehicle. Such a configuration of multiple speakers may be found in vehicles having a surround sound system. It may be understood that the system and method to localize the mobile device as disclosed above may be extended to include more than two speakers. Thus, each of the plurality of speakers 1805 may transmit a unique acoustic signal, each signal having its own time and frequency characteristics as disclosed above. In such a system and method, the mobile device may be localized in two dimensions within the vehicle cabin by determining its distance from each of the plurality of speakers. For example, the distance may be determined based on the time of reception by the mobile device of each of the plurality of acoustic signals transmitted by the plurality of speakers.

It is recognized that acoustic noise may interfere with a localization system based solely on the receipt of an acoustic signal. For example, if a large number of vehicles on the road rely on ultrasound emitter in the vehicle to determine the location of the phone, it is a possible that vehicle A with windows or doors opened might receive ultrasound interferences from nearby vehicle B. To prevent interference from nearby acoustical transmitters, the following techniques can be utilized:

Physical isolation and dampening—physical isolation may be used, such as closing door, closing a window, improved soundproofing, and improve electromagnetic isolation to reduce the effect of external Detect interference—the system may be configured to detect external interference, and to respond by applying a different method to detect location and positioning or adjust the acoustic characteristics of the transmitted acoustic signals and similarly adjust the software in the mobile device to respond to the new acoustic characteristics.

Because acoustic signals may be readily generated, it is possible that a user might attempt to circumvent the acoustic methods for localizing the mobile device. Such attempts may include, without limitation:

the use of an external speaker to play a sound that might interfere with the acoustic localization method;

the use of an external noise generator to mask the signal of the ultrasonic ping; and the use of a simulated acoustic signal.

Methods to combat attempts of such circumvention may include, alone or in combination:

modifying the acoustic characteristics of the of the acoustic signal;

changing the frequency of the ultrasonic pulse;

changing the phase of the ultrasonic pulse; and encoding or modulating the acoustic signal;

As disclosed above, power may be saved in a mobile device by only sampling the acoustic environment periodically. However, if transmitters within a vehicle transmit acoustic signals freely, it is possible that the mobile device may sample the acoustic environment at time periods between or within the transmissions of the acoustic signals. In this manner, the mobile device may not be able to distinguish an acoustic signal transmitted from one transmitter or speaker from another. In one embodiment, each speaker may emit an acoustic signal having acoustic characteristics that differ from the others. In this manner, the characteristics of an acoustic signal detected by the mobile device may be used to identify which speaker emitted a particular acoustic signal. In an alternative embodiment, the mobile device may be synchronized to the acoustic signals. In this manner, the mobile device may sample the acoustic environment at a predetermined time with respect to the transmission of all of the acoustic signals. In one embodiment, synchronization may be accomplished by the receipt by the mobile device of a synchronization signal produced by an apparatus or device that is also incorporated into the vehicle. The synchronization signal may have a predetermined delay time with respect to the first acoustic signal emitted by the first speaker. The mobile device may therefore begin recording sound from the acoustic environment upon receiving the synchronization signal. As disclosed above, the distance of the mobile device to the speakers may be determined by the delay in the receipt of the acoustic signal emitted by each of the speakers by the mobile device. It may be recognized that a synchronization signal should have characteristics such that no appreciable delay in the receipt of the signal by the mobile device may occur regardless of the position of the mobile device within the vehicle. Appropriate characteristics of the synchronization signal and the acoustic signals are illustrated in FIG. 10.

Figure 10:
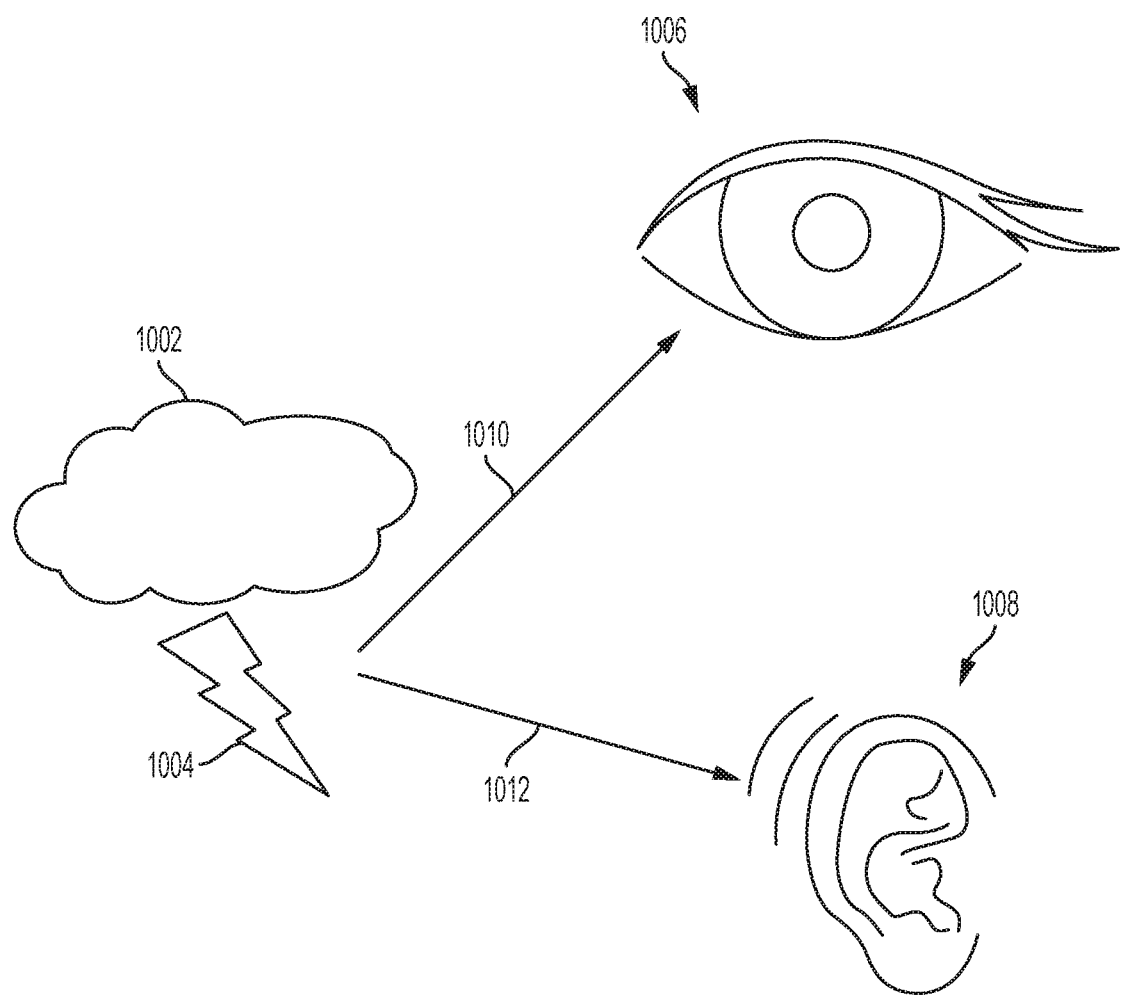
FIG. 10 is an illustration of a "flash-to-bang" phenomenon.

FIG. 10 illustrates a "flash-to-bang" method for synchronizing the recording of an acoustic signal by a mobile device to the transmitting of the acoustic signals. FIG. 10 illustrates a thunderstorm 1002 which produces both thunder and lightning 1004. The flash of lightning 1004 may be detected by an eye 1006 while the thunder may be detected by an ear 1008. A distance of a person from the thunderstorm 1002 may be roughly calculated by counting the number of seconds that pass between a flash of lightning and the crack of thunder that follows it, and dividing that number by five. The resulting number indicates approximately the number of miles the person is away from the lightning strike. This method is based on the fact that light travels much faster than sound through the atmosphere: light travels approximately 186,291 miles per second (299,800 km/s), whereas the speed of sound is only about 1,088 feet per second (332 meters per second), depending on air temperature. An RF wave travels approximately at the speed of light. Therefore, receipt by a mobile device of a synchronization signal based on an RF transmission will not suffer an appreciable delay regardless of the position of the mobile device within the vehicle.

Figure 11:
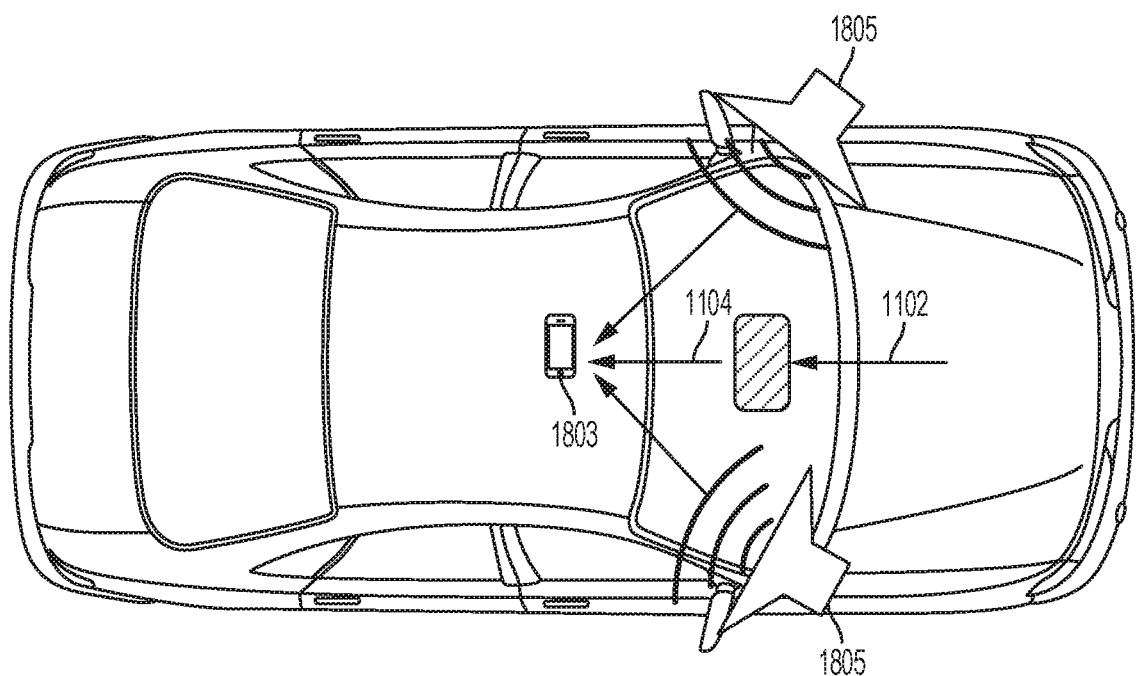
FIG. 11 is an illustration of two speakers and a wireless transceiver installed inside of a vehicle.

FIG. 11 illustrates a system in which a synchronization signal is emitted by an apparatus associated with a vehicle that is consistent with this method. FIG. 10 illustrates a vehicle in which a mobile device 1803 is located. As disclosed above, the system includes transmitters 1805 (such as speakers) that may emit acoustic signals. In addition, the system may include an additional RF signal transmitter 1102 configured to emit an RF signal 1104. In some embodiments, the RF signal transmitter 1102 may comprise a Bluetooth Enabled MCU device configured to transmit an RF signal 1104 such as a Bluetooth Smart wireless message. The Bluetooth wireless message, transmitted in the RF signal 1104, travels near the speed of light and may be received by the phone with certain, albeit small, latency. This Bluetooth message may inform the mobile device in the vehicle that one or more acoustic signals, comprising an ultrasonic pulse, may be emitted by the speakers with a known delay from the Bluetooth message. In such a manner, the Bluetooth broadcast message may comprise the synchronization signal. Once the phone receives the message, it will start recording and analyzing for the ultrasound pulse.

As illustrated in FIG. 11, an embodiment may include hardware including at least two speakers 1805 and one Bluetooth Enabled MCU 1102. The speakers 1805 can be driven using a PWM output with a simple amplifier. The MCU 1102 requires very little processing capability that most Bluetooth Smart SOC such as Nordic Semi's nrf51822 or Texas Instrument CC2540 is capable of performing all required functionality. Those Bluetooth SOC typically costs $2.0 at volume. In an embodiment of a method:

the MCU 1102 may send out a Bluetooth Smart broadcast message 1104; after a fixed time after the broadcast, an ultrasound pulse may be transmitted from the left speaker 1805 and the right speaker 1805, sequentially;

once the broadcast message 1104 has been received by the mobile phone 1803, the mobile phone 1803 may start the sound recording, for example according to the method disclosed above in FIG. 5;

because the latency of Bluetooth Smart is well known, the method embodied in software programmed into the mobile device 1803 will be synchronized to the production of the ultrasonic pulse by the speakers 1805;

a very aggressive and sensitive detection algorithm for processing the acoustic signal may therefore be applied based on the expected arrival time of the ultrasound pulse;

the arrival time of ultrasound pulses from left and right speakers 1805 are recorded, and distance calculated by the mobile device 1803.

Figure 12:
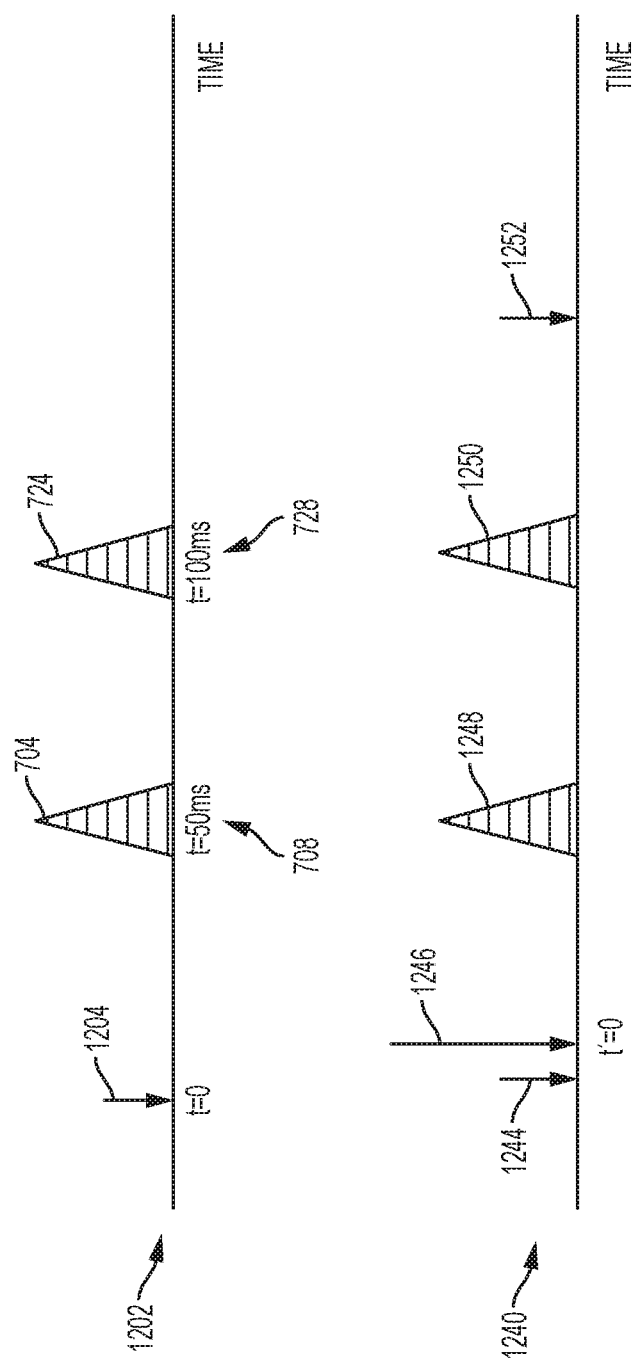
FIG. 12 is an illustration of a timing diagram for a system using a signal from a wireless transceiver and transmitters of acoustic signals.

FIG. 12 illustrates a timing diagram of features associated with the embodiment disclosed above. The vehicle may include hardware that together operates as illustrated the hardware timeline 1202. The mobile device may receive a plurality of signals from the hardware according to the device timeline 1240. In the hardware timeline, 1202, at a time t=0, the Bluetooth Enabled MCU may emit a synchronization signal 1204. In some examples, the synchronization 1204 may include the Bluetooth Smart broadcast message 1104 (FIG. 11). At some time after the transmission of the synchronization signal 1204, (for example at t=50 msecs.) the first speaker may emit a first acoustic signal 704. Thereafter, the second speaker may emit a second acoustic signal 724 (for example at t=100 msecs.). In the device timeline 1240, the mobile device may receive 1244 the synchronization signal. In response, after a delay time, the mobile device may begin recording 1246 sounds from the acoustic environment (at some time t'=0, later than the time t=0 corresponding to the time the Bluetooth Enabled MCU may emit the synchronization signal 1204. Thereafter, the mobile device records 1248 the first acoustic signal and then records 1250 the second acoustic signal. At some time 1252 after the recording is completed, the mobile device disables the recording function and begins to process the signals recorded from the acoustic environment.

The advantage of this embodiment may include the following:

the system greatly reduce processing requirement in the hardware; for example, a $2.0 Bluetooth+ARM Cortex M0 SOC may be sufficient;

the system greatly improves the battery life of mobile phone; because Bluetooth Smart or Low Energy is high efficient, and the phone is only recording and analyzing microphone data only as needed, battery drain may be kept to a minimum;

Bluetooth Smart does not require paring;

because the system is synchronized to the arrival time of the ultrasound pulses software embodiments of the detection and analysis methods can uses a more aggressive detection criteria to improve sensitivity without increasing false positive detection;

the system greatly reduces hardware complexity and therefore can lead to a faster time to market;

the system is easier to integrate into the vehicle because the system and method require almost no processing by the vehicle's processor, and speakers and Bluetooth Smart transceiver can be standard feature for newer cars; and the system can be readily installed without a requiring a professional installer.

As disclosed above, the embodiment is advantageous in minimizing the complexity and processing requirements and therefore may reduce the associated the hardware costs. Cost reduction may arise due to the following considerations:

no heavy processing required; a single chip solution for Bluetooth and processor that is $2.0, may be used instead of a separate Bluetooth ($2.0) and a expensive processor ($8~12);

no additional microphones need to be added to the vehicle hardware; and a realized circuit including the hardware components may have a reduced circuit board area.

An example of a bill of materials (BOM) is presented in Table 1, below.

TABLE 1

| Item Number | Quantity | Description | Unit Price | Extended Price |
|---|---|---|---|---|
| 1 | 1 | Nordic Semi nrf51822 MCU + BT | $2.066 | $ 2.07 |
| 2 | 2 | SSM2305Pseaker Amplifier | $0.65 | $ 1.30 |
| 3 | 2 | Ultrasound speaker | $1.04 | $ 2.08 |
| 4 | 1 | PCB Fab and Assembly | $3.00 | $ 3.00 |
| 5 | 1 | Mechanical Assembly | $2.00 | $ 2.00 |
| 6 | 20 | Various capacitors | $0.035 | $ 0.70 |
| 7 | 20 | Various Resistors | $0.0012 | $ 0.02 |
| 8 | 1 | Plastic Enclosure | $3.00 | $ 3.00 |
| 9 | 1 | Power Supply Cable | $1.05 | $ 1.05 |
| 10 | 1 | Box, Contents (packaging, user manual, CD, installation tools, etc.) | $3.00 | $ 3.00 |
| | | | Total Cost | $18.22 |

Additional financial advantages of the system may include:

Current financial models predict a NPV of $76 million at a unit cost of $73 for hardware associated with a system to detect the location of a mobile device in a vehicle. If the unit cost is lowered to $20, the NPV become $203 million. Based on cost-saving alone, this would increase the company valuation by 267%.

Since the technology is simpler, it improves time to market and increase speed of adoption. This new technology should reduce the product risk. Reducing the discount rate from 25% to 20% to reflect this de-risk would increase NPV from $203 million to $253 million.

For the aftermarket, systems based on the embodiment disclosed herein should not require professional installation. This would increase profit margin.

Under some circumstances, a person lacking a mobile device or having a mobile device in an off state or in airplane mode may enter a vehicle. I would be useful to include a method to determine if there is an active mobile device in proximity to the vehicle. Processing and power savings may be realized if the vehicle hardware and system can determine if methods to localize a mobile device are unnecessary. The above disclosure describes a sound-based localization technique in combination with a radio wave technology. In one embodiment, a radio wave technology such as Bluetooth, Bluetooth Smart/Low Energy, or NFC may be used to permit the vehicle-based electronics to determine whether the mobile device is in close proximity to a vehicle. Once the vehicle-based electronics determines that the mobile device is near the vehicle, they may then enable the sound-based localization techniques to determine the precise location of the mobile device and whether it is in the driver's area.

The radio technology may include one or more of the following techniques alone or in combination, to determine whether the electronic device is near the vehicle:
presence of a radio signal;
strength or amplitude of the radio signal (RSSI);
phase shift of the radio signal; and
frequency shift of the radio signal.

In an alternative embodiment, the vehicle-based electronics may determine the presence of a mobile device in proximity to the vehicle via sound localization. Once the mobile device is determined to be in proximity to or within the vehicle, the location of the mobile device with respect to the predetermined detection zone may be determined.

Figure 13:
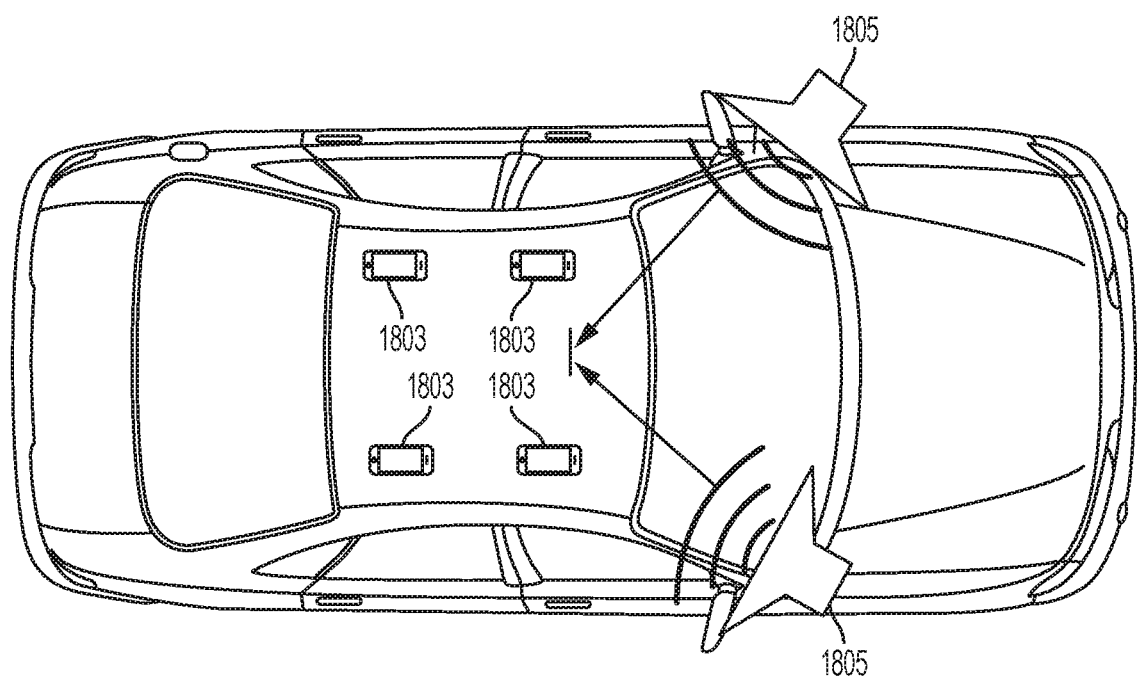
FIG. 13 is an illustration of a system to determine the location of a plurality of mobile devices within a vehicle.

The system and methods disclosed above have considered the problem of identifying a location of a single mobile device within a vehicle. It is recognized that there may be multiple occupants in a vehicle, each one possessing one or more mobile devices. FIG. 13 illustrates that multiple mobile devices 1803 within a vehicle may similarly located by acoustic means. It may be understood that acoustic signals transmitted by transmitters 1805 may be received by all of the mobile devices 1803 and each may determine its location within the vehicle accordingly. Although not depicted in FIG. 13, it may be further understood that localization techniques including the use of a synchronizing signal (as depicted in FIG. 11 and disclosed above) may similarly permit multiple mobile devices to determine their respective locations within the vehicle.

Figure 14:
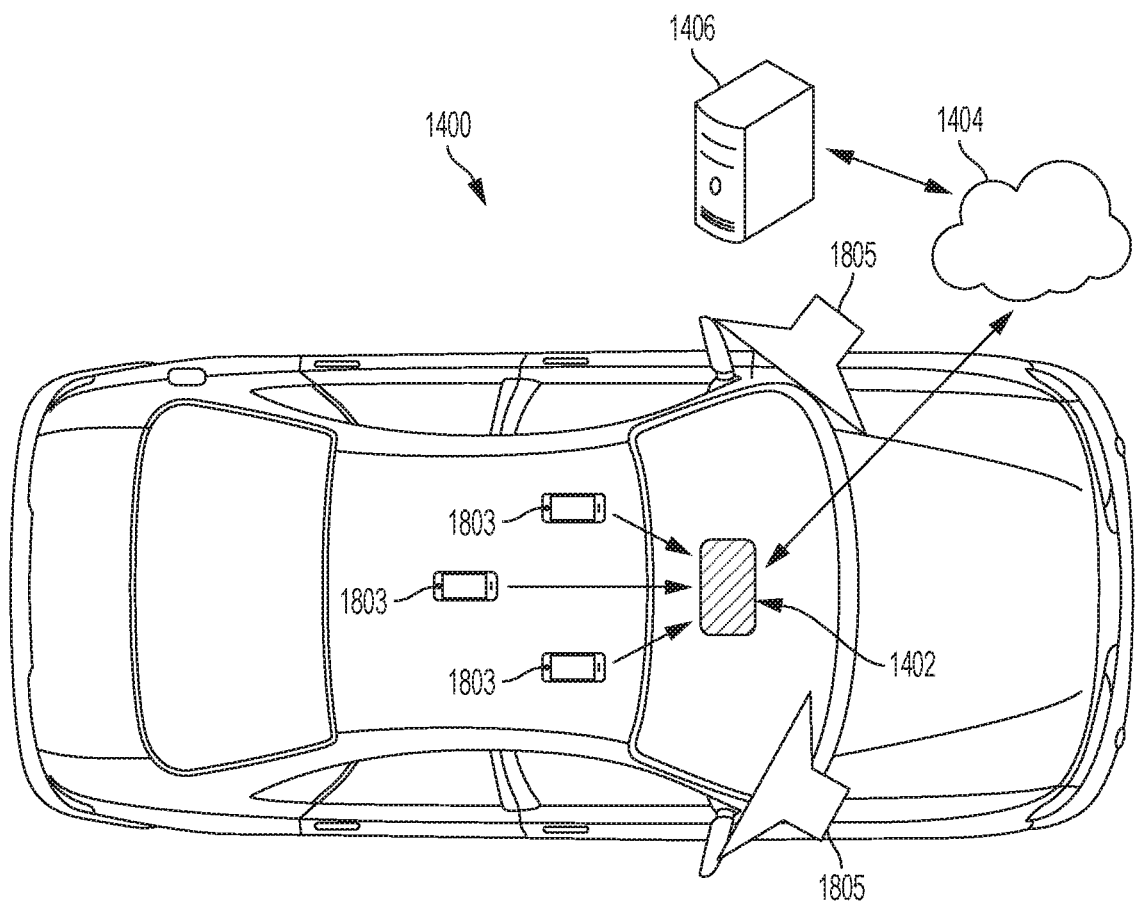
FIG. 14 is an illustration of communications by a plurality of mobile devices within a vehicle with a server external to the vehicle by means of a circuit located within the vehicle.
Figure 15:
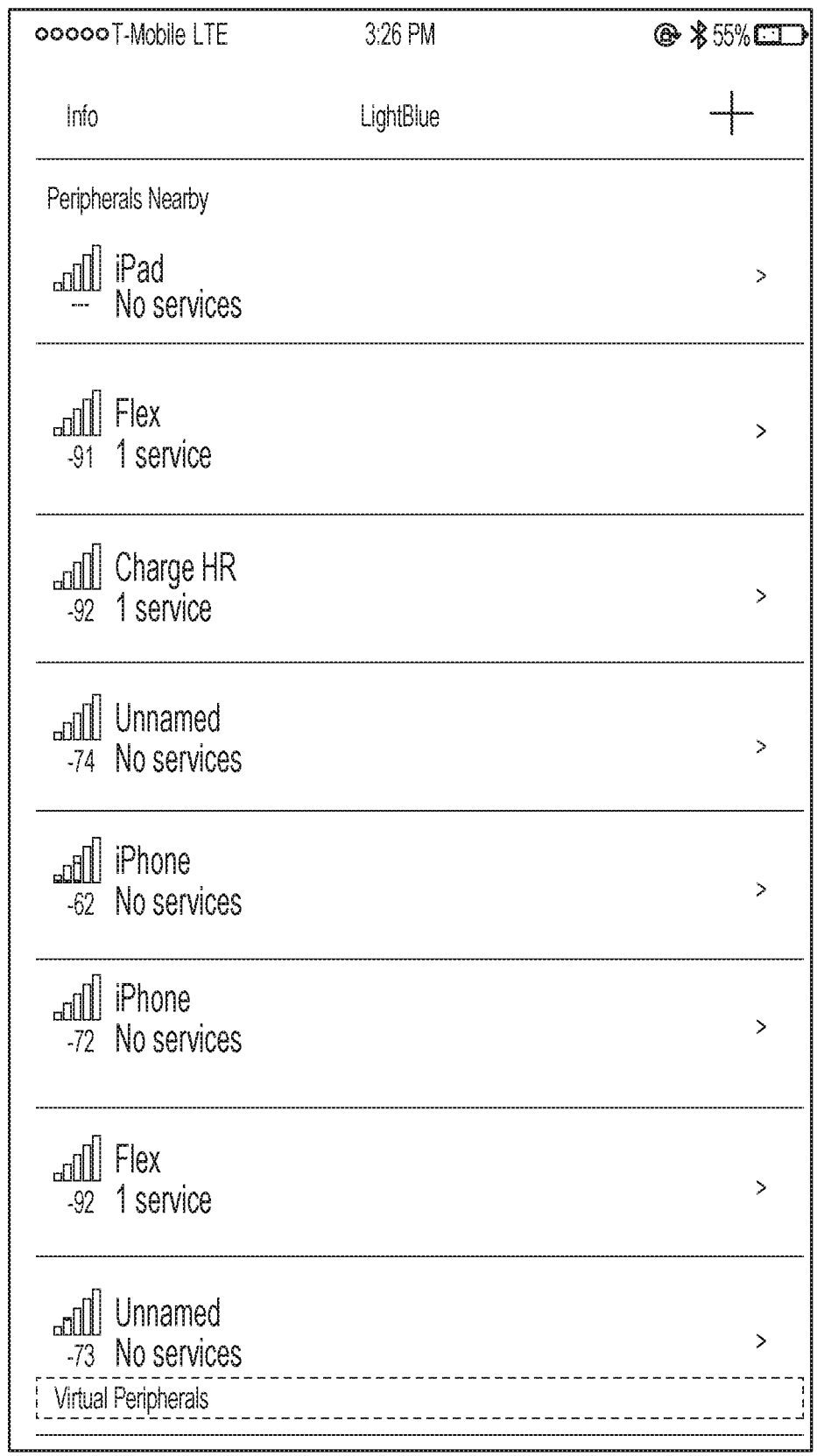
FIG. 15 is an illustration of a graphical interface of a mobile device detecting multiple mobile devices within a vehicle.

In another embodiment, the location and identification of multiple mobile devices within a vehicle may be determined based on wireless signals emitted by the mobile devices. FIG. 14 illustrates such a system. In one example, each of the mobile devices 1803 may receive acoustic signals from transmitters 1805 and determine their location within the vehicle. In some embodiments, each of the mobile devices 1803 may than transmit over a wireless connection, its respective location to a circuit or electrical device 1402 within the vehicle. Additionally, the electrical device 1402 may incorporate a cellular phone detector. The cellular phone detector may one take advantage of the fact that any cell phone periodically emitting a variety of wireless signal to communicate via cellular, WIFI, Bluetooth, Bluetooth Smart, NFC and etc. In this manner, the electrical device 1402 may passively determine the presence of one or more mobile devices 1803 within the vehicle by monitoring the transmissions of the mobile devices 1803. Alternatively, the electrical device 1402 may incorporate standard WIFI sniffing technology or packed analyzer. To detect a cell phone through its Bluetooth connection, the electrical device 1402 can implement Bluetooth Smart listener function to scan nearby Bluetooth Smart (or Bluetooth Low Energy) capable. FIG. 15 illustrates devices that can be detected by a Bluetooth Low Energy scanner application (for example, implemented on an iPhone, as an example) to detect nearby devices. FIG. 15 illustrates at least 2 iPhones and 1 iPads were detected through Bluetooth.

Returning to FIG. 14, it may be understood that information regarding the location of one or more mobile devices within a vehicle, as well as their identification information, may also be shared with devices outside of the vehicle. In one embodiment of such a system 1400, information received by an electrical device 1402 within the vehicle may be relayed through one or more wireless communication protocols such as a cellular phone communication protocols to a computer cloud computing system 1404 and the results may be stored in a memory component of one or more servers 1406. The server 1406 may comprise one or more processors and one or more transitory and/or non-transitory memory. The locational and identification information from the one or more mobile devices may be stored in a database resident in the memory component of the one or more serves 1406.

In addition to the location of a mobile device within the vehicle, the information may include identifying information about the mobile device including, without limitation, a MAC address, a list of applications resident on the device, and information related to the use of the device. If the electrical device 1402 is additionally connected to the ODB-11 (On-Board Diagnostics System) interface, the electrical device 1402 may also be able to correlate driving performance with a driver possessing an identified mobile device. For example, the electrical device 1402 may receive vehicle information such as speed, break, sensor information, diagnostic and other information available from the ODB-11 port. An additional advantage is that the electrical device 1402 may also be powered through the vehicle power system, and not require an additional power supply.

The information stored on the server 1406 may be accessed by a user over one or more communications interfaces. In some embodiments, the server 1406 may include operations to restrict the access of the mobile device information to an authorized user. An authorized user may include a law enforcement user, an insurance user, and a healthcare user. For example, insurance providers may use this information to set the premium for personalized usage-based insurance rate. Information that may be of use to the insurance provider may include, without limitation, which driver is driving the vehicle as well as the driving performance of the driver (from ODB-11 information).

This information can be collected and stored in a back-end database. Access may be restricted according to any standard mechanism including, without limitation, the use of an identifier name, a password, a biometric token (such as a scanned finger print), a one-time password token, and similar. The server 1406 may then determine that the received security token or identifier is valid, and permit access to the information.

In an additional embodiment, the electrical device 1402 may transmit one or more messages back to the mobile device 1803 that has been localized to the predetermined detection zone (for example, at the driver's side of the vehicle). Such a message may include information regarding the state of the vehicle based on the ODB-11 information. As one example, if the vehicle is operating in an auto-pilot mode, a text message may be forwarded to the driver to indicate a potential hazard that the auto-pilot mode is unable to address. Such a warning message may include a request that the driver should resume manual control of the vehicle.

Figure 16:
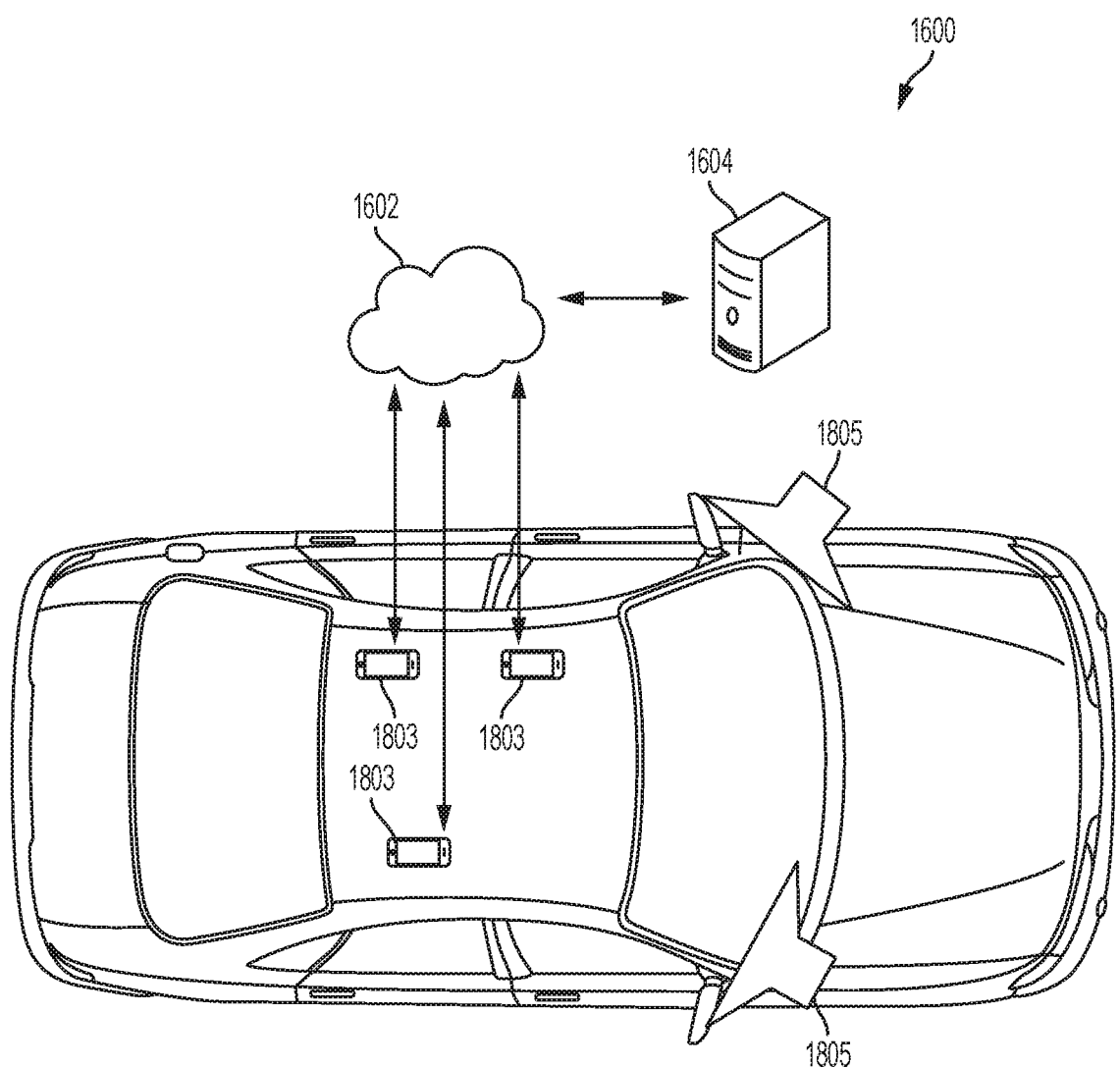
FIG. 16 is an illustration of communications by a plurality of mobile devices with a server external to a vehicle.

FIG. 16 illustrates an alternative embodiment 1600. In embodiment 1600, each of the mobile devices 1803 transmits its own data through one or more wireless communication protocols such as cellular phone communication protocols to a computer cloud system 1602 and the results may be stored in a memory component of one or more servers 1604. The server 1604 may comprise one or more processors and one or more transitory and/or non-transitory memory. The locational and identification information from the one or more mobile devices may be stored in a database resident in the memory component of the one or more serves 1604. In addition to the location of a mobile device within the vehicle, the information may include identifying information about the mobile device including, without limitation, a MAC address, a list of applications resident on the device, and information related to the use of the device. The information stored on the server 1604 may be accessed by a user over one or more communications interfaces. In some embodiments, the server 1604 may include operations to restrict the access of the mobile device information to an authorized user. An authorized user may include a law enforcement user, an insurance user, and a healthcare user. Access may be restricted according to any standard mechanism including, without limitation, the use of an identifier name, a password, a biometric token (such as a scanned finger print), a one-time password token, and similar. The server 1604 may then determine that the received security token or identifier is valid, and permit access to the information.

Figure 17:
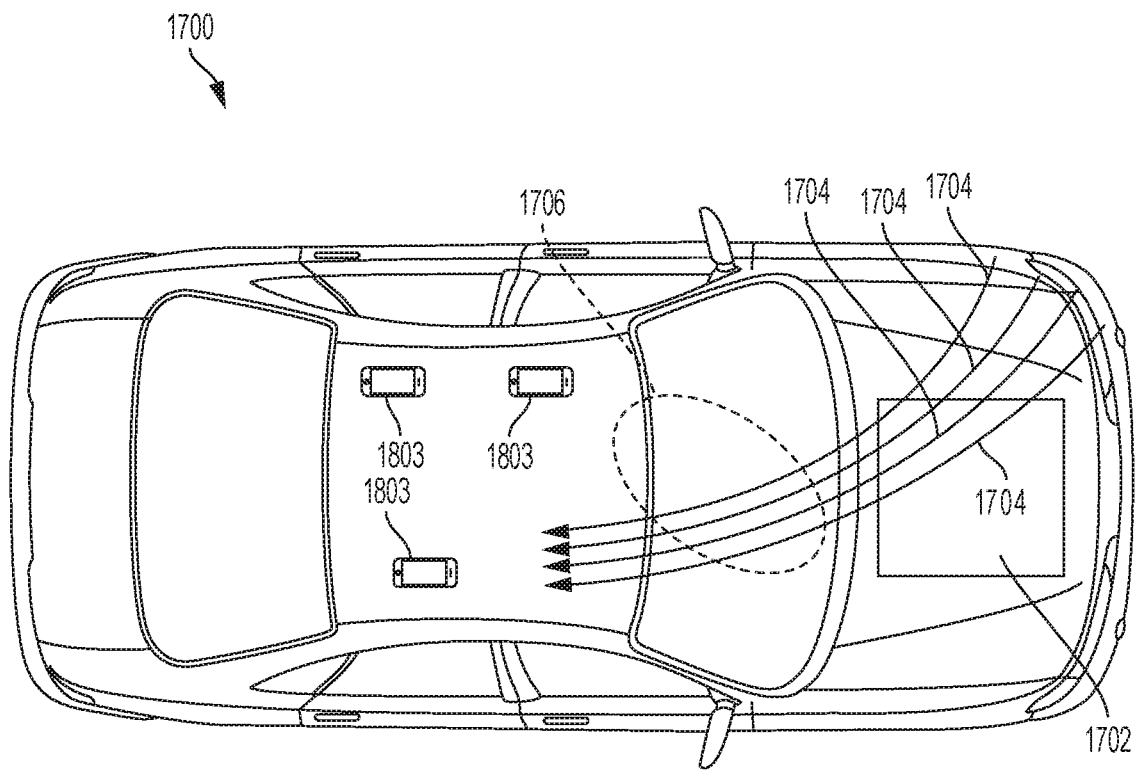
FIG. 17 is an illustration of a system to determine the location of a plurality of mobile devices within a vehicle based on measurement of an external magnetic flux.

In alternative embodiments, the location of a mobile device within a vehicle may be determined based on other sensors. FIG. 17 illustrates a method 1700 of determining the location of a mobile device 1803 in a vehicle based on the measurement of geomagnetic flux. Such a method 1700 may not require additional hardware within in the vehicle and may rely instead on a magnetometer integrated in the mobile device 1803 to detect changes 1706 in the natural geomagnetic flux 1704 due to the body of the vehicle. It is well understood that certain types of metals, such as ferric metals, can alter magnetic flux lines. A typical vehicle is 65% steel by weight. The extra steel content in the vehicle (for example, as may be found in the engine block 1702, frame, and undercarriage) may cause incident natural geomagnetic flux lines 1704 to bend 1706. A magnetic map of the vehicle may be calculated or measured to determine how a location within the vehicle can correlate to changes in the magnetic flux lines. Because a vehicle has large amount of metallic material and there is an asymmetry between the metal structure near the driver or the passenger seat, there is a difference in magnetic field reading that could be useful in determine whether the electronic device is in the driver zone. Therefore, such a magnetic map can be used to identify the driver zone. Such a system has been implemented, for example, as part of an indoor navigation technology that uses the magnetometer in the phone to sense the steel/iron structure in which the mobile device 1803 is located. Locational accuracy may be improved when there is a large amount of steel in the structure.

Figure 18:
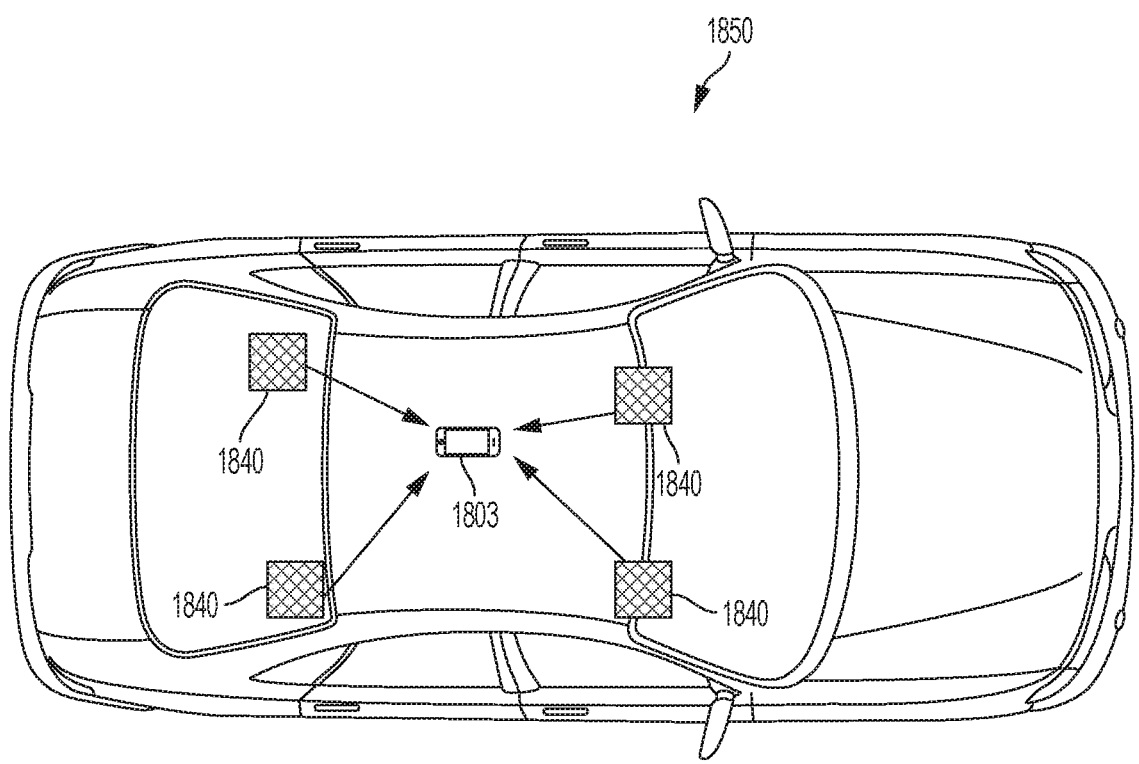
FIG. 18 is an illustration of a system to determine the location of a mobile device within a vehicle based on a measurement of data provided by a plurality of beacons disposed within a vehicle.

As disclosed above, localization of a mobile device may be determined based on acoustic transmitters, magnetic sensors, or detectors of wireless transmissions from the mobile device. Alternatively, a beacon-based system may be employed in which beacons can be placed within the vehicle, and the mobile device may determine a distance from each beacon. Such a system is analogous to indoor GPS systems. FIG. 18 illustrates a generic depiction of such a beacon-based system 1850. As illustrated in FIG. 18, a plurality of beacons 1840 may be disposed within the vehicle. The mobile device 1803 may then determine its position relative to each of the beacons. Examples of beacon-based localization systems may include one or more or a combination of:

Magnetic beacons—one or more beacons made of magnet or component with specific magnetic signature can be placed inside the vehicle to give different position different magnetic signature. The cell phone can detect the difference in magnetic signature and determine its location.

Sound beacon—one or more beacons made of emitter of audible or non-audible sound can be placed to provide locating signal for the cell phone via localization technique such as time-of-flight, Doppler shift calculation.

Light beacon—One or more beacons made of emitter of human visible or non-visible light.

Chemical beacon—One or more beacons that release a specific chemical to its surrounding.

Pressure beacon—Beacons that changes the air pressure in the nearby area.

Mechanical beacon—Beacons that provides a specific mechanical property such as vibration Radio beacons—Beacons that emits electromagnetic energy with frequency 200 MHz to 50 GHz.

It may be recognized that a combination acoustic, wifi, and beacon-based technology may be used together for improved localization accuracy. For example, wireless technology may be used to establish the approximate location of a mobile device. An ultrasound sensor may be used to provide precise or fine location determinations. Additionally, magnetic technology as well as GPS and position techniques may provide more refined information.

The various illustrative functional elements, logical blocks, modules, circuits, and processors described in connection with the embodiments disclosed herein may be implemented or performed with an appropriate processor device, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein as appropriate. As described herein a processor may be a microprocessor, but in the alternative, the processor may be any conventional processor, controller, microcontroller, or state machine designed to perform the appropriate function. A processor may be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format.

The functions of the various functional elements, logical blocks, modules, and circuits elements described in connection with the embodiments disclosed herein may be performed through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the terms "processor" or "module" should not be construed to refer exclusively to hardware capable of executing software, and may implicitly include, without limitation, DSP hardware, read-only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

The various functional elements, logical blocks, modules, and circuits elements described in connection with the embodiments disclosed herein may comprise a processing unit for executing software program instructions to provide computing and processing operations for the systems and methods described herein. A processing unit may be responsible for performing various voice and data communications operations between the mobile device and other components of an appropriate system. Although the processing unit may include a single processor architecture, it may be appreciated that any suitable processor architecture and/or any suitable number of processors in accordance with the described embodiments. In one embodiment, the processing unit may be implemented using a single integrated processor.

The functions of the various functional elements, logical blocks, modules, and circuits elements described in connection with the embodiments disclosed herein may also be implemented in the general context of computer executable instructions, such as software, control modules, logic, and/or logic modules executed by the processing unit. Generally, software, control modules, logic, and/or logic modules include any software element arranged to perform particular operations. Software, control modules, logic, and/or logic modules can include routines, programs, objects, components, data structures and the like that perform particular tasks or implement particular abstract data types. An implementation of the software, control modules, logic, and/or logic modules and techniques may be stored on and/or transmitted across some form of computer-readable media. In this regard, computer-readable media can be any available medium or media useable to store information and accessible by a computing device. Some embodiments also may be practiced in distributed computing environments where operations are performed by one or more remote processing devices that are linked through a communications network. In a distributed computing environment, software, control modules, logic, and/or logic modules may be located in both local and remote computer storage media including memory storage devices.

Additionally, it is to be appreciated that the embodiments described herein illustrate example implementations, and that the functional elements, logical blocks, modules, and circuits elements may be implemented in various other ways which are consistent with the described embodiments. Furthermore, the operations performed by such functional elements, logical blocks, modules, and circuits elements may be combined and/or separated for a given implementation and may be performed by a greater number or fewer number of components or modules. As will be apparent to those of skill in the art upon reading the present disclosure, each of the individual embodiments described and illustrated herein has discrete components and features which may be readily separated from or combined with the features of any of the other several aspects without departing from the scope of the present disclosure. Any recited method can be carried out in the order of events recited or in any other order which is logically possible.

It is worthy to note that any reference to "one embodiment" or "an embodiment" means that a particular feature, structure, or characteristic described in connection with the embodiment is included in at least one embodiment. The appearances of the phrase "in one embodiment" or "in one aspect" in the specification are not necessarily all referring to the same embodiment.

Unless specifically stated otherwise, it may be appreciated that terms such as "processing," "computing," "calculating," "determining," or the like, refer to the action and/or processes of a computer or computing system, or similar electronic computing device, such as a general purpose processor, a DSP, ASIC, FPGA or other programmable logic device, discrete gate or transistor logic, discrete hardware components, or any combination thereof designed to perform the functions described herein that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, application program interface (API), exchanging messages, and so forth.

It will be appreciated that those skilled in the art will be able to devise various arrangements which, although not explicitly described or shown herein, embody the principles of the present disclosure and are included within the scope thereof. Furthermore, all examples and conditional language recited herein are principally intended to aid the reader in understanding the principles described in the present disclosure and the concepts contributed to furthering the art, and are to be construed as being without limitation to such specifically recited examples and conditions. Moreover, all statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present disclosure, therefore, is not intended to be limited to the example aspects and aspects shown and described herein. Rather, the scope of present disclosure is embodied by the appended claims.

The terms "a" and "an" and "the" and similar referents used in the context of the present disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or example language (e.g., "such as", "in the case", "by way of example") provided herein is intended merely to better illuminate the present disclosure and does not pose a limitation on the scope of the present disclosure otherwise claimed. No language in the specification should be construed as indicating any non-claimed element essential to the practice of the present disclosure. It is further noted that the claims may be drafted to exclude any optional element. As such, this statement is intended to serve as antecedent basis for use of such exclusive terminology as solely, only and the like in connection with the recitation of claim elements, or use of a negative limitation.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability.

While certain features of the embodiments have been illustrated as described above, many modifications, substitutions, changes and equivalents will now occur to those skilled in the art. It is therefore to be understood that the appended claims are intended to cover all such modifications and changes as fall within the scope of the disclosed embodiments.

Various embodiments are described in the following numbered clauses:

1. A system for determining a presence of a mobile device located in a predetermined detection zone within a vehicle, the system comprising: a mobile device comprising a processor, wherein the mobile device is configured to periodically record sounds from an acoustic environment, and wherein the processor configured to: determine that the periodically recorded sounds comprise a periodically recorded first acoustic signal comprising a first ultrasonic pulse and a second acoustic signal comprising a second ultrasonic pulse; calculate, from the periodically recorded sounds, a first time of arrival of the first acoustic signal and a second time of arrival of the second acoustic signal; determine a location of the mobile device within the vehicle based on the first time of arrival and the second time of arrival; and determine that the location of the mobile device matches the predetermined detection zone.

2. The system of clause 1, wherein upon determining that the location of the mobile device matches the predetermined detection zone, the processor is further configured to cause the mobile device to inhibit at least one function of the mobile device.

3. The system of clause 1, wherein upon determining that the location of the mobile device matches the predetermined detection zone, the processor is further configured to cause the mobile device to alter the activity of at least one function of the mobile device.

4. The system of clause 1, wherein upon determining that the location of the mobile device matches the predetermined detection zone, the processor is further configured to cause the mobile device to issue a notification to a user of the mobile device.

5. The system of clause 1, wherein the first acoustic signal has a first acoustic characteristic and the second acoustic signal has a second acoustic characteristic.

6. The system of clause 5, wherein the first acoustic characteristic differs from the second acoustic characteristic.

7. The system of clause 5, wherein the first acoustic characteristic and the second acoustic characteristic independently comprise an acoustic signal period.

8. The system of clause 5, wherein the first acoustic characteristic and the second acoustic characteristic independently comprise an ultrasonic pulse width.

9. The system of clause 5, wherein the first acoustic characteristic and the second acoustic characteristic independently comprise an acoustic signal duty cycle.

10. The system of clause 5, wherein the first acoustic characteristic and the second acoustic characteristic independently comprise an ultrasonic pulse central frequency.

11. The system of clause 5, wherein the first acoustic characteristic and the second acoustic characteristic independently comprise an ultrasonic pulse shape.

12. The system of clause 1, wherein the processor is further configured to: calculate, from the periodically recorded sounds, a power of the first acoustic signal and a power of the second acoustic signal; and determine a location of the mobile device within the vehicle based on the power of the first acoustic signal and the power of the second acoustic signal.

13. A method for determining a presence of a mobile device located in a predetermined detection zone within a vehicle, the method comprising: periodically recording, by the mobile device comprising a processor, a plurality of sounds comprising an acoustic environment; determining, by the processor, that the periodically recorded sounds comprise a periodically recorded first acoustic signal comprising a first ultrasonic pulse and a second acoustic signal comprising a second ultrasonic pulse; calculating, by the processor from the periodically recorded sounds, a first time of arrival of the first acoustic signal and a second time of arrival of the second acoustic signal; determining, by the processor, a location of the mobile device within the vehicle based on the first time of arrival and the second time of arrival; and determining, by the processor, that the location of the mobile device matches the predetermined detection zone.

14. The method of clause 13, further comprising, upon determining that the location of the mobile device matches the predetermined detection zone, causing, by the processor, the mobile device to inhibit at least one function of the mobile device.

15. The method of clause 13, further comprising, upon determining that the location of the mobile device matches the predetermined detection zone, causing, by the processor, the mobile device to alter the activity of at least one function of the mobile device.

16. The method of clause 13, further comprising, upon determining that the location of the mobile device matches the predetermined detection zone, causing, by the processor, the mobile device to issue a notification to a user of the mobile device.

17. The method of clause 13, further comprising: determining that the periodically recorded sounds comprise a periodically recorded first acoustic signal comprising a first ultrasonic pulse having first acoustic characteristic; and determining that the periodically recorded sounds comprise a periodically recorded second acoustic signal comprising a second ultrasonic pulse having second acoustic characteristic.

18. The method of clause 13, further comprising: determining that the periodically recorded sounds comprise a periodically recorded first acoustic signal comprising a first ultrasonic pulse having a frequency in the range of 15 kHz to 60 kHz; and determining that the periodically recorded sounds comprise a periodically recorded second acoustic signal comprising a second ultrasonic pulse having a frequency in the range 15 kHz to 60 kHz.

19. The method of clause 13, further comprising: determining that the periodically recorded sounds comprise a periodically recorded first acoustic signal comprising a first ultrasonic pulse having a frequency in the range of 10 kHz to 21 kHz; and determining that the periodically recorded sounds comprise a periodically recorded second acoustic signal comprising a second ultrasonic pulse having a frequency in the range 10 kHz to 21 kHz.

20. The method of clause 13, further comprising: calculating, from the periodically recorded sounds, a power of the first acoustic signal and a power of the second acoustic signal; and determining a location of the mobile device within the vehicle based on the power of the first acoustic signal and the power of the second acoustic signal.

21. A method for determining a presence of a mobile device located in a predetermined detection zone within a vehicle, the method comprising: receiving, by a mobile device, a wireless synchronization signal; recording, by the mobile comprising a processor, a plurality of sounds comprising an acoustic environment upon receiving the wireless synchronization signal; determining, by the processor, that the recording of the plurality of sounds comprise a recorded first acoustic signal comprising a first ultrasonic pulse and a second acoustic signal comprising a second ultrasonic pulse; calculating, by the processor, from the recorded sounds, a first time of arrival of the first acoustic signal and a second time of arrival of the second acoustic signal; determining, by the processor, a location of the mobile device within the vehicle based on the first time of arrival and the second time of arrival; and determining, by the processor, that the location of the mobile device matches the predetermined detection zone.

22. The method of clause 21, further comprising, upon determining that the location of the mobile device matches the predetermined detection zone, causing, by the processor, the mobile device to inhibit at least one function of the mobile device.

23. The method of clause 21, further comprising, upon determining that the location of the mobile device matches the predetermined detection zone, causing, by the processor, the mobile device to alter the activity of at least one function of the mobile device.

24. The method of clause 21, further comprising, upon determining that the location of the mobile device matches the predetermined detection zone, causing, by the processor, the mobile device to issue a notification to a user of the mobile device.

25. The method of clause 21, wherein receiving, by a mobile device, a wireless synchronization signal comprises receiving, by the mobile device, a Bluetooth broadcast message comprising the synchronization signal.

26. A method of providing a location of at least one mobile device within a vehicle to recipient, the method comprising: receiving, by a server comprising a processor and a memory, data from a mobile device, wherein the data from the mobile device comprises a location of the mobile device within a vehicle; storing, by the server processor, the data from the mobile device in the server memory; and providing, by the server processor, the data from the mobile device to the recipient via a communication interface.

27. The method of clause 26, wherein receiving, by a server comprising a processor and a memory, data from a mobile device further comprises receiving, by a server, identification data from the mobile device.

28. The method of clause 26, wherein storing the mobile device data by the server processor in the server memory comprises storing, by the server processor, the mobile device data in a database stored in the server memory.

29. The method of clause 26, wherein providing, by the server processor, the data from the mobile device to the recipient via a communication interface comprises: receiving, by the server processor, a security token from the recipient via the communication interface; determining, by the server processor, that the security token is a valid security token; and providing, by the server processor, the data from the mobile device to the recipient via a communication interface.

30. The method of clause 26, wherein receiving, by a server comprising a processor and a memory, data from a mobile device comprises receiving, by a server comprising a processor and a memory, data from the mobile device via a wireless communications protocol.

31. The method of clause 30, wherein receiving, by a server comprising a processor and a memory, data from a mobile device comprises receiving, by a server comprising a processor and a memory, data from the mobile device via a cellular phone communication protocol.

What is claimed is:

1. An apparatus to determine the presence of a mobile device located in a predetermined detection zone within a vehicle, the apparatus comprising:
   the mobile device comprising:
     an acoustic receiver configured to receive a plurality of sounds comprising an acoustic environment;
     a processor configured to receive acoustic data from the acoustic receiver, wherein the acoustic data corresponds to the plurality of sounds comprising the acoustic environment;
     a non-transitory memory in data communication with the processor, wherein the non-transitory memory stores instructions that, when executed by the processor, causes the processor to:
       periodically record the acoustic data;
       determine that the periodically recorded acoustic data comprise a periodically recorded first acoustic signal comprising a first ultrasonic pulse and a second acoustic signal comprising a second ultrasonic pulse;
       calculate a first time of arrival of the first acoustic signal and a second time of arrival of the second acoustic signal;
       determine a location of the mobile device within the vehicle based on the first time of arrival and the second time of arrival;
       determine that the location of the mobile device matches the predetermined detection zone;
       determine that the periodically recorded acoustic data comprise a periodically recorded first acoustic signal comprising a first ultrasonic pulse having a frequency in the range of 15 kHz to 60 kHz; and determine that the periodically recorded acoustic data comprise a periodically recorded second acoustic signal comprising a second ultrasonic pulse having a frequency in the range 15 kHz to 60 kHz.

2. The apparatus of claim 1, wherein the non-transitory memory stores instructions that, when executed by the processor, further cause the processor, upon determining that the location of the mobile device matches the predetermined detection zone, to cause the mobile device to inhibit at least one function of the mobile device.

3. The apparatus of claim 1, wherein the non-transitory memory stores instructions that, when executed by the processor, further cause the processor, upon determining that the location of the mobile device matches the predetermined detection zone, to cause the mobile device to alter the activity of at least one function of the mobile device.

4. The apparatus of claim 1, wherein the non-transitory memory stores instructions that, when executed by the processor, further cause the processor, upon determining that the location of the mobile device matches the predetermined detection zone, to cause the mobile device to issue a notification to a user of the mobile device.

5. The apparatus of claim 1, wherein the non-transitory memory stores instructions that, when executed by the processor, further cause the processor to:
determine that the periodically recorded acoustic data comprise a periodically recorded first acoustic signal comprising a first ultrasonic pulse having first acoustic characteristic; and
determine that the periodically recorded acoustic data comprise a periodically recorded second acoustic signal comprising a second ultrasonic pulse having second acoustic characteristic.

6. The apparatus of claim 1, wherein the non-transitory memory stores instructions that, when executed by the processor, further cause the processor to:
calculate, from the periodically recorded acoustic data, a power of the first acoustic signal and a power of the second acoustic signal; and
determine a location of the mobile device within the vehicle based on the power of the first acoustic signal and the power of the second acoustic signal.

7. A apparatus for determining a presence of a mobile device located in a predetermined detection zone within a vehicle, the apparatus comprising:
the mobile device, comprising:
a wireless signal receiver configured to receive one or more radio frequency (RF) signals;
an acoustic receiver configured to receive a plurality of sounds comprising an acoustic environment;
a processor configured to receive:
acoustic data from the acoustic receiver, wherein the acoustic data corresponds to the plurality of sounds comprising the acoustic environment; and
a wireless synchronization signal from the wireless signal receiver;
a non-transitory memory in data communication with the processor, wherein the non-transitory memory stores instructions that, when executed by the processor, causes the processor to:
receive the wireless synchronization signal;
record the acoustic data upon receiving the wireless synchronization signal;
determine that the periodically recorded acoustic data comprise a periodically recorded first acoustic signal comprising a first ultrasonic pulse and a second acoustic signal comprising a second ultrasonic pulse;
calculate a first time of arrival of the first acoustic signal and a second time of arrival of the second acoustic signal;
determine a location of the mobile device within the vehicle based on the first time of arrival and the second time of arrival;
determine that the location of the mobile device matches the predetermined detection zone;
determine that the periodically recorded acoustic data comprise a periodically recorded first acoustic signal comprising a first ultrasonic pulse having a frequency in the range of 15 kHz to 60 kHz; and
determine that the periodically recorded acoustic data comprise a periodically recorded second acoustic signal comprising a second ultrasonic pulse having a frequency in the range 15 kHz to 60 kHz.

8. The apparatus of claim 7, wherein the non-transitory memory stores instructions that, when executed by the processor, further cause the processor, upon determining that the location of the mobile device matches the predetermined detection zone, to cause the mobile device to inhibit at least one function of the mobile device.

9. The apparatus of claim 7, wherein the non-transitory memory stores instructions that, when executed by the processor, further cause the processor, upon determining that the location of the mobile device matches the predetermined detection zone, to cause the mobile device to alter the activity of at least one function of the mobile device.

10. The apparatus of claim 7, wherein the non-transitory memory stores instructions that, when executed by the processor, further cause the processor, upon determining that the location of the mobile device matches the predetermined detection zone, to cause the mobile device to issue a notification to a user of the mobile device.

11. The apparatus of claim 7, wherein the wireless synchronization signal comprises a Bluetooth broadcast message comprising the wireless synchronization signal.

* * * * *